(12) United States Patent
Thioux

(10) Patent No.: US 9,973,531 B1
(45) Date of Patent: May 15, 2018

(54) SHELLCODE DETECTION

(71) Applicant: FireEye, Inc., Milpitas, CA (US)

(72) Inventor: Emmanuel Thioux, Santa Cruz, CA (US)

(73) Assignee: FireEye, Inc., Milpitas, CA (US)

( * ) Notice: Subject to any disclaimer, the term of this patent is extended or adjusted under 35 U.S.C. 154(b) by 0 days. days.

(21) Appl. No.: 14/311,000

(22) Filed: Jun. 20, 2014

Related U.S. Application Data

(60) Provisional application No. 62/009,135, filed on Jun. 6, 2014.

(51) Int. Cl.
*H04L 29/06* (2006.01)
*G06F 9/455* (2018.01)

(52) U.S. Cl.
CPC ...... *H04L 63/1466* (2013.01); *G06F 9/45558* (2013.01); *G06F 2009/45587* (2013.01)

(58) Field of Classification Search
CPC ... H04L 63/1466; H04L 9/14; H04L 63/1416; H04L 63/1408; H04L 63/0428; H04L 63/08
See application file for complete search history.

(56) References Cited

U.S. PATENT DOCUMENTS

| | | | |
|---|---|---|---|
| 4,292,580 A | 9/1981 | Ott et al. | |
| 5,175,732 A | 12/1992 | Hendel et al. | |
| 5,440,723 A | 8/1995 | Arnold et al. | |
| 5,490,249 A | 2/1996 | Miller | |
| 5,657,473 A | 8/1997 | Killean et al. | |
| 5,842,002 A | 11/1998 | Schnurer et al. | |
| 5,978,917 A | 11/1999 | Chi | |
| 6,088,803 A | 7/2000 | Tso et al. | |
| 6,094,677 A | 7/2000 | Capek et al. | |
| 6,108,799 A | 8/2000 | Boulay et al. | |
| 6,118,382 A | 9/2000 | Hibbs et al. | |
| 6,269,330 B1 | 7/2001 | Cidon et al. | |
| 6,272,641 B1 | 8/2001 | Ji | |

(Continued)

FOREIGN PATENT DOCUMENTS

| GB | 2439806 A | 1/2008 |
|---|---|---|
| GB | 2490431 A | 10/2012 |

(Continued)

OTHER PUBLICATIONS

Rahman, Mahmud Ab; Getting Owned by Malicious PDF—Analysis; 2010, SANS Institute, pp. 1-39.*

(Continued)

*Primary Examiner* — Carl Colin
*Assistant Examiner* — Vance Little
(74) *Attorney, Agent, or Firm* — Rutan & Tucker, LLP

(57) ABSTRACT

According to one embodiment, a threat detection system is integrated with at least a dynamic analysis engine. The dynamic analysis engine is configured to automatically determine whether one or more objects included in received network traffic contains a heap spray attack. Upon detection of a potential heap spray attack, the dynamic analysis engine may copy potential shellcode within an object included in the received network traffic, insert the copy of the potential shellcode into a second region of allocated memory and analyze the execution of the potential shellcode to determine whether characteristics associated with an exploit are present.

29 Claims, 17 Drawing Sheets

(56) References Cited

U.S. PATENT DOCUMENTS

| | | |
|---|---|---|
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,196,205 B2 * | 6/2012 | Gribble et al. .................. 726/24 |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |

(56) References Cited

U.S. PATENT DOCUMENTS

| | | |
|---|---|---|
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,282 B1 | 11/2014 | Aziz et al. |
| 8,898,788 B1 | 11/2014 | Aziz et al. |
| 8,935,779 B2 | 1/2015 | Manni et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,694 B2 | 8/2015 | Aziz et al. |
| 9,118,715 B2 | 8/2015 | Staniford et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1* | 1/2006 | Brickell et al. ................. 726/22 |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |

(56) References Cited

U.S. PATENT DOCUMENTS

| | | |
|---|---|---|
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0181227 A1 | 7/2008 | Todd |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0031353 A1 | 2/2010 | Thomas et al. |
| 2010/0031359 A1* | 2/2010 | Alme ............................ 726/24 |
| 2010/0037314 A1 | 2/2010 | Perdisci et al. |
| 2010/0054278 A1 | 3/2010 | Stolfo et al. |
| 2010/0115621 A1 | 5/2010 | Staniford et al. |
| 2010/0180344 A1 | 7/2010 | Malyshev et al. |
| 2010/0192223 A1 | 7/2010 | Ismael et al. |
| 2010/0205674 A1* | 8/2010 | Zorn et al. .................... 726/25 |
| 2010/0220863 A1 | 9/2010 | Dupaquis et al. |
| 2010/0235831 A1 | 9/2010 | Dittmer |
| 2010/0281541 A1 | 11/2010 | Stolfo et al. |
| 2010/0281542 A1 | 11/2010 | Stolfo et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1* | 8/2012 | Staniford et al. ............... 726/24 |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0317570 A1* | 12/2012 | Dalcher ................ G06F 21/53 718/1 |
| 2012/0330801 A1 | 12/2012 | McDougal et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |

(56) References Cited

U.S. PATENT DOCUMENTS

| | | | |
|---|---|---|---|
| 2013/0196649 A1 | 8/2013 | Paddon et al. | |
| 2013/0227691 A1 | 8/2013 | Aziz et al. | |
| 2013/0246370 A1 | 9/2013 | Bartram et al. | |
| 2013/0263260 A1 | 10/2013 | Mahaffey et al. | |
| 2013/0291109 A1 | 10/2013 | Staniford et al. | |
| 2013/0298243 A1 | 11/2013 | Kumar et al. | |
| 2014/0053260 A1 | 2/2014 | Gupta et al. | |
| 2014/0053261 A1 | 2/2014 | Gupta et al. | |
| 2014/0130158 A1 | 5/2014 | Wang et al. | |
| 2014/0137180 A1 | 5/2014 | Lukacs et al. | |
| 2014/0169762 A1 | 6/2014 | Ryu | |
| 2014/0179360 A1 | 6/2014 | Jackson et al. | |
| 2014/0245444 A1* | 8/2014 | Lutas | G06F 12/109 726/24 |
| 2014/0328204 A1 | 11/2014 | Klotsche et al. | |
| 2014/0337836 A1 | 11/2014 | Ismael | |
| 2014/0351935 A1 | 11/2014 | Shao et al. | |
| 2015/0096025 A1 | 4/2015 | Ismael | |

FOREIGN PATENT DOCUMENTS

| | | |
|---|---|---|
| WO | 02/23805 A2 | 3/2002 |
| WO | 02/006928 A2 | 8/2003 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2013/067505 A1 | 5/2013 |

OTHER PUBLICATIONS

U.S. Appl. No. 14/311,035, filed Jun. 20, 2014 Non-Final Office Action dated Jul. 6, 2015.

"Network Security: NetDetector—Network Intrusion Forensic System (NIFS) Whitepaper", ("NetDetector Whitepaper"), (2003).

"Packet", Microsoft Computer Dictionary, Microsoft Press, (Mar. 2002), 1 page.

"When Virtual is Better Than Real", IEEEXplore Digital Library, available at, http://ieeexplore.ieee.org/xpl/articleDetails.jsp?reload=true&arnumbe-r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

Adobe Systems Incorporated, "PDF 32000-1:2008, Document management—Portable document format—Part1:PDF 1.7", First Edition, Jul. 1, 2008, 756 pages.

AltaVista Advanced Search Results. "attack vector identifier". Http://www.altavista.com/web/results?Itag=ody&pg=aq&aqmode=aqa=Event+Orch- estrator . . . , (Accessed on Sep. 15, 2009).

AltaVista Advanced Search Results. "Event Orchestrator". Http://www.altavista.com/web/results?Itag=ody&pg=aq&aqmode=aqa=Event+Orch- esrator . . . , (Accessed on Sep. 3, 2009).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen").

Cisco "Intrusion Prevention for the Cisco ASA 5500-x Series" Data Sheet (2012).

Cisco, Configuring the Catalyst Switched Port Analyzer (SPAN) ("Cisco"), (1992-2003).

Clark, John, Sylvian Leblanc,and Scott Knight. "Risks associated with usb hardware trojan devices used by insiders." Systems Conference (SysCon), 2011 IEEE International. IEEE, 2011.

Cohen, M.I. , "PyFlag—An advanced network forensic framework", Digital investigation 5, Elsevier, (2008), pp. S112-S120.

Costa, M. , et al., "Vigilante: End-to-End Containment of Internet Worms", SOSP '05, Association for Computing Machinery, Inc., Brighton U.K., (Oct. 23-26, 2005).

Crandall, J.R. , et al., "Minos:Control Data Attack Prevention Orthogonal to Memory Model", 37th International Symposium on Microarchitecture, Portland, Oregon, (Dec. 2004).

Deutsch, P. , "Zlib compressed data format specification version 3.3" RFC 1950, (1996).

Distler, "Malware Analysis: an Introduction", SANS Institute InfoSec Reading Room, SANS Institute, (2007).

Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

Excerpt regarding First Printing Date for Merike Kaeo, Designing Network Security ("Kaeo"), (2005).

Filiol, Eric , et al., "Combinatorial Optimisation of Worm Propagation on an Unknown Network", International Journal of Computer Science 2.2 (2007).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Gibler, Clint, et al. AndroidLeaks: automatically detecting potential privacy leaks in android applications on a large scale. Springer Berlin Heidelberg, 2012.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:https://web.archive.org/web/20121022220617/http://www.informationweek- .com/microsofts-honeymonkeys-show-patching-wi/167600716 [retrieved on Sep. 29, 2014].

Heng Yin et al, Panorama: Capturing System-Wide Information Flow for Malware Detection and Analysis, Research Showcase @ CMU, Carnegie Mellon University, 2007.

Hjelmvik, Erik , "Passive Network Security Analysis with NetworkMiner", (IN)Secure, Issue 18, (Oct. 2008), pp. 1-100.

Idika et al., A-Survey-of-Malware-Detection-Techniques, Feb. 2, 2007, Department of Computer Science, Purdue University.

IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

(56) References Cited

OTHER PUBLICATIONS

Kaeo, Merike, "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Kim, H., et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King").

Krasnyansky, Max, et al., Universal TUN/TAP driver, available at https://www.kernel.org/doc/Documentation/networking/tuntap.txt (2002) ("Krasnyansky").

Kreibich, C., et al., "Honeycomb-Creating Intrusion Detection Signatures Using Honeypots", 2nd Workshop on Hot Topics in Networks (HotNets-11), Boston, USA, (2003).

Kristoff, J., "Botnets, Detection and Mitigation: DNS-Based Techniques", NU Security Day, (2005), 23 pages.

Leading Colleges Select FireEye to Stop Malware-Related Data Breaches, FireEye Inc., 2009.

Li et al., A VMM-Based System Call Interposition Framework for Program Monitoring, Dec. 2010, IEEE 16th International Conference on Parallel and Distributed Systems, pp. 706-711.

Liljenstam, Michael, et al., "Simulating Realistic Network Traffic for Worm Warning System Design and Testing", Institute for Security Technology studies, Dartmouth College ("Liljenstam"), (Oct. 27, 2003).

Lindorfer, Martina, Clemens Kolbitsch, and Paolo Milani Comparetti. "Detecting environment-sensitive malware." Recent Advances in Intrusion Detection. Springer Berlin Heidelberg, 2011.

Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12—final107.pdf [retrieved on Dec. 15, 2014].

Marchette, David J "Computer Intrusion Detection and Network Monitoring: A Statistical Viewpoint", ("Marchette"), (2001).

Margolis, P.E., "Random House Webster's 'Computer & Internet Dictionary 3rd Edition'", ISBN 0375703519, (Dec. 1998).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Newsome, J., et al., "Polygraph: Automatically Generating Signatures for Polymorphic Worms", In Proceedings of the IEEE Symposium on Security and Privacy, (May 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.—N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doom, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Spitzner, Lance, "Honeypots: Tracking Hackers", ("Spizner"), (Sep. 17, 2002).

The Sniffers's Guide to Raw Traffic available at: yuba.stanford.edu/.about.casado/pcap/section1.html, (Jan. 6, 2014).

Thomas H. Ptacek, and Timothy N. Newsham, "Insertion, Evasion, and Denial of Service: Eluding Network Intrusion Detection", Secure Networks, ("Ptacek"), (Jan. 1998).

U.S. Pat. No. 8,171,553 filed Apr. 20, 2006, Inter Parties Review Decision dated Jul. 10, 2015.

U.S. Pat. No. 8,291,499 filed Mar. 16, 2012, Inter Parties Review Decision dated Jul. 10, 2015.

Venezia, Paul, "NetDetector Captures Intrusions", InfoWorld Issue 27, ("Venezia"), (Jul. 14, 2003).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

* cited by examiner

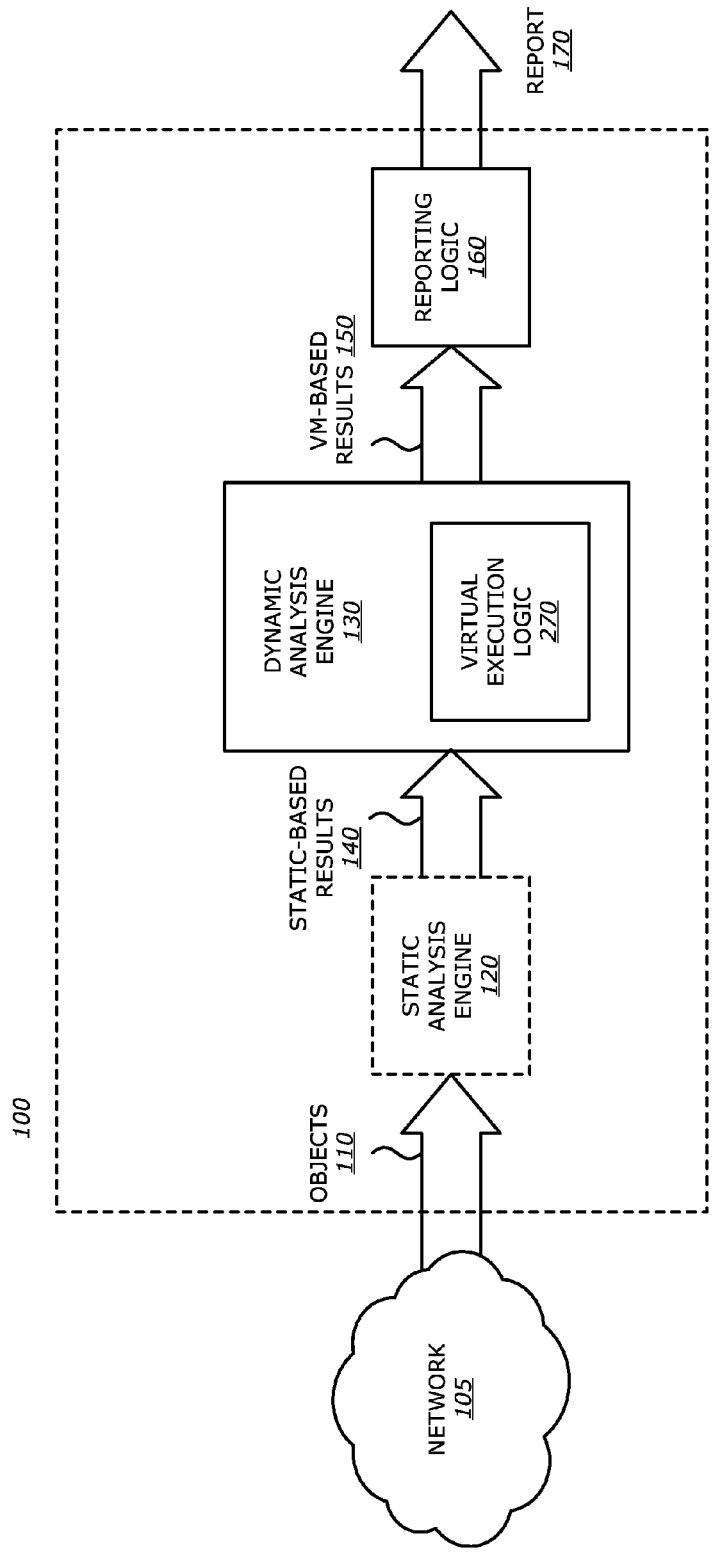

SHELLCODE DETECTION

CROSS-REFERENCE TO RELATED APPLICATIONS

This application claims the benefit of priority on U.S. Provisional Application No. 62/009,135, filed Jun. 6, 2014, the entire contents of which are incorporated by reference herein.

FIELD

Embodiments of the disclosure relate to the field of cyber-security. More specifically, one embodiment of the disclosure relates to a system, apparatus and method for detecting malware utilizing shellcode in an attack by extracting potential shellcode, executing the potential shellcode in a virtual machine (VM) and observing unexpected behaviors or activities of the potential shellcode.

GENERAL BACKGROUND

Over the last decade, malicious software has become a pervasive problem for Internet users as many networked resources include vulnerabilities that are subject to attack. For instance, over the past few years, more and more vulnerabilities are being discovered in software that is loaded onto network devices, such as vulnerabilities within operating systems for example. While some vulnerabilities continue to be addressed through software patches, prior to the release of such software patches, network devices will continue to be targeted for attack by malware, namely information such as computer code that attempts during execution to take advantage of a vulnerability in computer software by acquiring sensitive information or adversely influencing or attacking normal operations of the network device or the entire enterprise network.

In particular, a technique known as "heap spraying" allows an exploit residing within software of a network device to more easily take advantage of a vulnerability within software (e.g., an application or an operating system) running on the network device. During a heap spray attack, an exploit inserts a portion of code including a sequence of No Operation (NOP) instructions and a sequence of bytes at a particular location within memory of the network device. The sequence of bytes may be directed at performing malicious activity, wherein the sequence of bytes may be in the form of code, commonly referred to as "shellcode." This particular location is a predictable memory location within a heap (e.g., a predetermined amount of virtual memory allocated for the software). Once code has been inserted into the heap, the exploit may be triggered during processing which causes the application to execute the shellcode thereby allowing the exploit to assume control of the execution of code on the network device. This enables the attacker to execute instructions on the network device which may be malicious to the network device, to its content or to the owner of the network device. Heap spray attacks use chunks of No Operation (NOP) instructions, also known as NOP sleds, to facilitate the execution of the shellcode. By orienting a NOP sled at an address just prior to shellcode, the execution flow of the processing unit of the network device is quickly directed to the shellcode.

The NOP instructions may be a sequence of known instructions (e.g., "patterns"). Conventional heap spray detection methods attempt to identify heap spray attacks by detecting the NOP sleds and comparing the sequence of NOP instructions to NOP instructions appearing on a list of permitted (and non-malicious) NOP instructions. Such a list may be referred to as a "whitelist" of NOP instructions. Those sequences of NOP instructions found on the whitelist are dismissed as non-malicious. However, those sequences of NOP instructions found in the heap but not found on the whitelist are flagged as a NOP sled portion of a heap spray attack.

Several issues with a detection strategy using a whitelist of NOP instructions exist. First, comparing sequences of NOP instructions to NOP instructions appearing on a whitelist results in a high number of false positives as a whitelist rarely contains all possible permitted or non-malicious NOP instructions. Several non-malicious NOP instructions not appearing on the whitelist may reside in received network traffic. This in turn prompts the detection system to improperly flag one or more objects within the network traffic as containing a heap spray attack and return a false positive to a network administrator.

Second, as false positives are reported, the NOP instruction that caused the false positive is typically added to the whitelist in order to prevent future false positives based on that particular non-malicious NOP instruction. However, a whitelist of all possible non-malicious NOP instructions is untenable because such as list would require constant updating.

During execution of malware, one or more portions of the computer code that contain an exploit may not be executed for various reasons. For example, the application containing or associated with the malware may crash prior to the execution of the exploit. When the exploit does not execute, it may go undetected. In particular, when a heap spray attack is being utilized to facilitate exploitation of a vulnerability, at least a portion of shellcode may not execute therefore allowing at least a portion of an exploit to go undetected. Therefore, there is a need for a way to improve detection of exploits that utilize shellcode.

BRIEF DESCRIPTION OF THE DRAWINGS

Embodiments of the invention are illustrated by way of example and not by way of limitation in the figures of the accompanying drawings, in which like references indicate similar elements and in which:

FIG. 1 is an exemplary block diagram of an operational flow of threat detection and prevention within a network device.

DETAILED DESCRIPTION

Figure 2A:
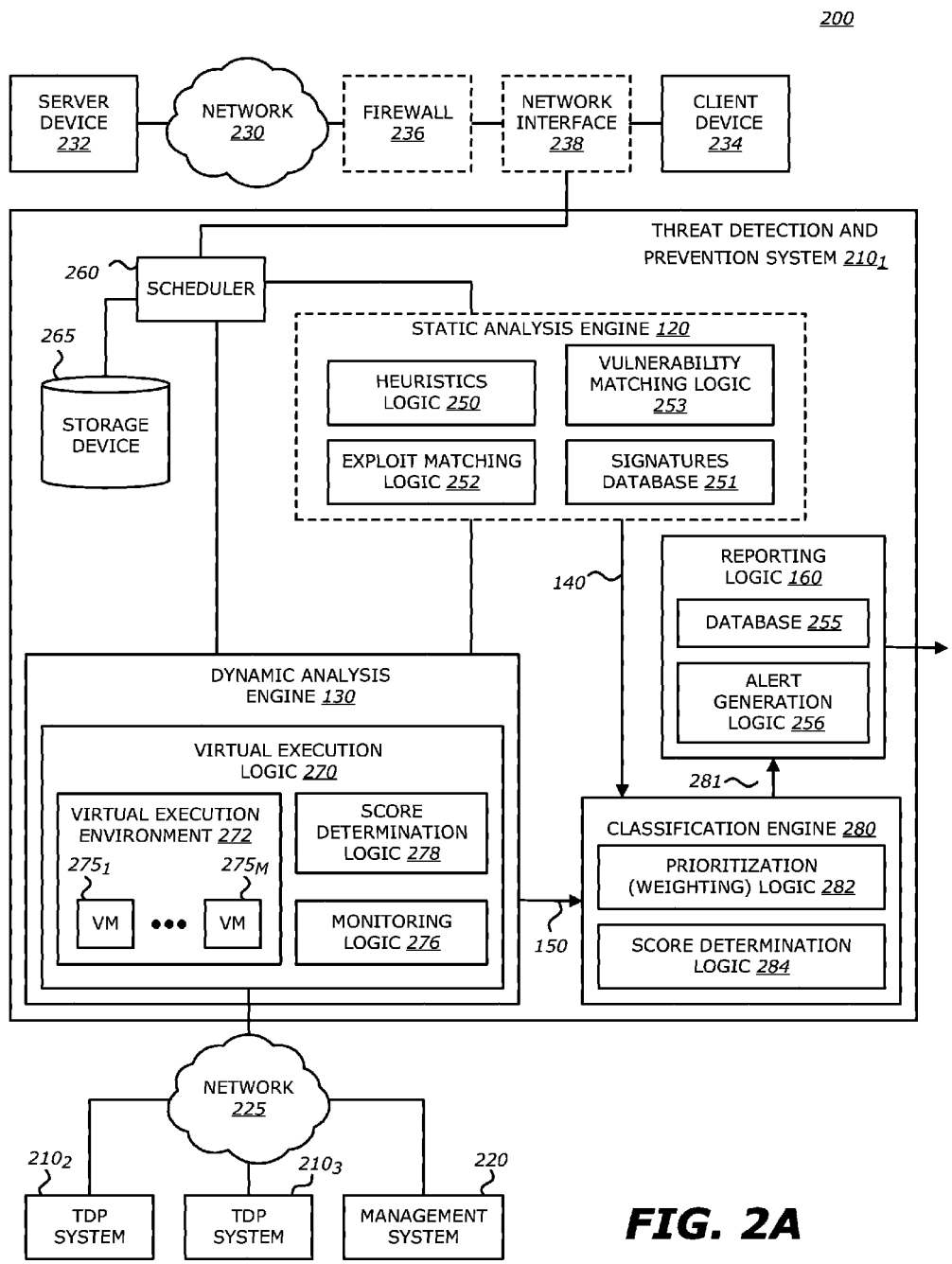
FIG. 2A is an exemplary block diagram of a communication system deploying a plurality of threat detection and prevention (TDP) systems communicatively coupled to a management system via a network.

Various embodiments of the disclosure relate to a network device, such as a threat detection and prevention (TDP) system for example, where the network device comprises an optional static analysis engine and a dynamic analysis engine. According to one embodiment of the disclosure, the static analysis engine filters information from received network traffic and analyzes the information to determine whether at least a portion of the received network traffic is likely to be associated with malware. A portion of the received network traffic, (hereinafter "object(s)"), that is determined to likely be associated with malware is deemed "suspicious." The dynamic analysis engine comprises virtual execution logic to automatically analyze one or more objects while the object(s) executes within a virtual machine. In particular, the dynamic analysis engine comprises logic to analyze the memory allocation for the object(s) in order to detect a potential heap spray attack.

Upon the detection of a potential heap spray attack, if the dynamic analysis engine detects the presence of suspicious code that is possibly shellcode within the object(s), the dynamic analysis engine extracts a copy of the potential shellcode and inserts the copy into a new region of memory allocated for further analysis of the copy. Furthermore, the permissions of the new region of memory allocated for the further analysis are established to ensure the execution of the copy is able to execute. With the permissions explicitly set to read and execute, the copy is more likely to execute than the original version of the potential shellcode. This gives the logic within the dynamic analysis engine a higher probability (opportunity) to analyze the execution of the potential shellcode and detect anomalous behavior thereby indicating a likelihood that the copy is shellcode and associated with malware.

I. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "object" generally refers to a collection of data, whether in transit (e.g., over a network) or at rest (e.g., stored), often having a logical structure or organization that enables it to be classified for purposes of analysis. During analysis, for example, the object may exhibit a set of expected characteristics and, during processing, a set of expected behaviors. The object may also exhibit a set of unexpected characteristics and a set of unexpected behaviors that may evidence an exploit and potentially allow the object to be classified as an exploit.

Examples of objects may include one or more flows or a self-contained element within a flow itself. A "flow" generally refers to related packets that are received, transmitted, or exchanged within a communication session. For convenience, a packet is broadly referred to as a series of bits or bytes having a prescribed format, which may include packets, frames, or cells.

As an illustrative example, an object may include a set of flows such as (1) a sequence of transmissions in accordance with a particular communication protocol (e.g., User Datagram Protocol (UDP); Transmission Control Protocol (TCP); or Hypertext Transfer Protocol (HTTP); etc.), or (2) inter-process communications (e.g., Remote Procedure Call "RPC" or analogous processes, etc.). Similar, as another illustrative example, the object may be a self-contained element, where different types of such objects may include an executable file, non-executable file (such as a document or a dynamically link library), a Portable Document Format (PDF) file, a JavaScript file, Zip file, a Flash file, a document (for example, a Microsoft Office® document), an electronic mail (email), downloaded web page, an instant messaging element in accordance with Session Initiation Protocol (SIP) or another messaging protocol, or the like.

An "exploit" may be construed broadly as information (e.g., executable code, data, command(s), etc.) that attempts to take advantage of a software vulnerability. Typically, a "vulnerability" is a coding error or artifact of software (e.g., computer program) that allows an attacker to alter legitimate control flow during processing of the software (computer program) by a network device, and thus, causes the network device to experience undesirable or unexpected behaviors. The undesired or unexpected behaviors may include a communication-based anomaly or an execution-based anomaly, which, for example, could (1) alter the functionality of an network device executing application software in a malicious manner; (2) alter the functionality of the network device executing that application software without any malicious intent; and/or (3) provide unwanted functionality which may be generally acceptable in another context. To illustrate, a computer program may be considered as a state machine, where all valid states (and transitions between states) are managed and defined by the program, in which case an exploit may be viewed as seeking to alter one or more of the states (or transitions) from those defined by the program.

Malware may be construed broadly as computer code that executes an exploit to take advantage of a vulnerability, for example, to harm or co-opt operation of a network device or misappropriate, modify or delete data. Conventionally, malware is often said to be designed with malicious intent. An object may constitute or contain malware, for example, shellcode, which may be injected into a heap during a heap spray attack.

The term "shellcode" refers to a small piece of executable code that resides in data (e.g., is injected into data), is used as a payload of malware, and, in some cases, contains a shell command to execute an exploit.

The term "transmission medium" is a physical or logical communication path between two or more network devices (e.g., any devices with data processing and network connectivity such as, for example, a security appliance, a server, a mainframe, a computer such as a desktop or laptop, netbook, tablet, firewall, smart phone, router, switch, bridge, etc.). For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

In certain instances, the term "detected" is used herein to represent that there is a prescribed level of confidence (or probability) on the presence of an exploit or heap spray attack within an object under analysis. For instance, the virtual execution logic may detect the presence of a heap spray attack by monitoring or observing unexpected or anomalous behaviors or activities, and, in response, determining that the object includes a heap spray attack.

The term "pattern" should be construed as a predefined sequence of instructions. A pattern may appear in memory, such as memory allocated in a virtual execution environment for use by an application being executed by a virtual machine. In some embodiments, the length of the pattern may correspond to the operating system of the network device which is undergoing analysis. For example, a pattern may consist of four bytes when the network device is running a 32-bit operating system (this may be referred to as a double word, or "DWORD"). Therefore, the DWORD may contain up to four (4) instructions, which may be four (4) NOP instructions, for example. Alternatively, a pattern may consist of eight bytes when the network device is running a 64-bit operating system (this may be referred to as a quad word, or "QWORD"). Therefore, the QWORD may contain up to eight (8) instructions, which may be eight (8) NOP instructions, for example.

In addition, a blacklisted pattern is a pattern that has been preselected and placed on a list comprising one or more preselected patterns. A blacklist may be used in a comparison to, among other things, determine whether the particular item in the comparison needs to be flagged as being associated with a malicious attack.

The term "NOP sled" should be construed as a sequence of NOP instructions constituting a pattern. A NOP sled may also be a sequence of instructions that collectively do not change the state of the process when executed. Accordingly, while an individual instruction within the NOP sled may change the state of the process, another instruction in the NOP sled would operate to reverse that change, yielding no net change of state. NOP sleds are commonly used with heap spray attacks in order to facilitate the execution of shell code.

The term "network device" should be construed as any electronic device with the capability of connecting to a network. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, a computer, etc.

The term "computerized" generally represents that any corresponding operations are conducted by hardware in combination with software and/or firmware. Also, the terms "compare" or "comparison" generally mean determining if a match (e.g., a certain level of correlation) is achieved between two items where one of the items may include a particular signature pattern.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The invention may be utilized for detection, verification and/or prioritization of malicious content such as exploits and/or heap spray attacks. As this invention is susceptible to embodiments of many different forms, it is intended that the present disclosure is to be considered as an example of the principles of the invention and not intended to limit the invention to the specific embodiments shown and described.

II. Heap Spray Detection within a TDP System

A. Heap Spray Detection Methodology

Referring to FIG. 1, an exemplary block diagram of an operational flow for heap spray detection by a network device 100 (e.g., a TDP system) is shown. Herein, some or all of the incoming objects 110 associated with monitored network traffic are received by virtual execution logic 270, which is part of a dynamic analysis engine 130 (see FIGS. 2A-2B), either directly or via an optional static analysis engine 120. According to one embodiment of the disclosure, when deployed in the network device 100, the static analysis engine 120 is configured as a capture and filter device that receives the incoming objects 110 and conducts heuristics, exploit signature checks and/or vulnerability signature checks on some or all of the objects 110, as described below, to identify "suspicious" objects having one or more characteristics associated with an exploit.

The virtual execution logic 270 conducts an in-depth analysis of an object, for example, each suspicious object, of the incoming objects 110 by creating and executing an instance of an application to virtually process the object and analyze, for example, the application's memory allocation and, if triggered, patterns detected within the allocated memory. The virtual execution logic 270 may compare the amount of memory allocated to a predetermined threshold over a predefined time interval and compare detected patterns with either patterns known to be associated with heap spray attacks or patterns known to be non-malicious.

Upon conducting at least an analysis of (i) the memory allocation for an application used to process the suspicious object of the incoming objects 110 and if triggered, (ii) detected patterns stored within memory allocated to the process, the dynamic analysis engine 130 provides the results 150 of its analysis (referred to herein as "VM-based results") to reporting logic 160 for storage in database 255 and subsequent access. If implemented as part of the network device 100, the static analysis engine 120 provides results 140 of its analysis (referred to herein as "static-based results") to reporting logic 160 for storage in database 255 and subsequent access.

Thereafter, at least portions of the static-based results 140 and the VM-based results 150 for the incoming objects 110 may be combined by the reporting logic 160. The reporting logic 160 may issue an alert or report 170 (e.g., an email message, text message, display screen image, etc.) to security administrators for example, communicating the urgency in handling one or more detected heap spray attacks. Alternatively, the alert or report 170 may trigger a further analysis of the object to verify the behavior of the object as an exploit.

According to one embodiment of the disclosure, the communicative coupling between the static analysis engine 120 and the dynamic analysis engine 130 is provided in a serial configuration, where the incoming object(s) 110 (or a copy thereof) may be processed in the virtual execution logic 270 after analysis by the static analysis engine 120. However, it is contemplated that the static analysis engine 120 and the dynamic analysis engine 130 may be provided in a parallel configuration, where the incoming object(s) 110 (or copy thereof) may be processed in the virtual execution logic 270 concurrently with analysis of objects by the static analysis engine 120.

B. General Architecture of Network Device Deploying Heap Spray Detection Logic

Referring to FIG. 2A, an exemplary block diagram of a heap spray detection environment 200 deploying a plurality of threat detection and prevention (TDP) systems $210_1$-$210_N$ (N>1, e.g., N=3) communicatively coupled to a management system 220 via a network 225 is shown. The heap spray detection environment 200 comprises a server device 232, an optional firewall 236, a client device 234 and a TDP system $210_1$ communicatively coupled to the network 230 via a network interface 238. The TDP system $210_1$ is further communicatively coupled to the management system 220 and one or more TDP systems $210_2$-$210_3$ via the network 225. In general, management system 220 is adapted to manage TDP systems $210_2$-$210_3$. For instance, management system 220 is responsible for automatically updating a blacklist of NOP instruction patterns used by the virtual execution logic 270 within some or all of TDP systems $210_1$-$210_N$.

Herein, according to the embodiment illustrated in FIG. 2A, a first TDP system $210_1$ is a network device that is adapted to analyze information associated with network traffic routed over a communication network 230 between at least one server device 232 and at least one client device 234. The communication network 230 may include a public network such as the Internet, in which case an optional firewall 236 (represented by dashed lines) may be interposed in the communication path between the public network and the client device 234. Alternatively, the communication network 230 may be a private network such as a wireless data telecommunication network, wide area network, a type of local area network (LAN), or a combination of networks.

Figure 2B:
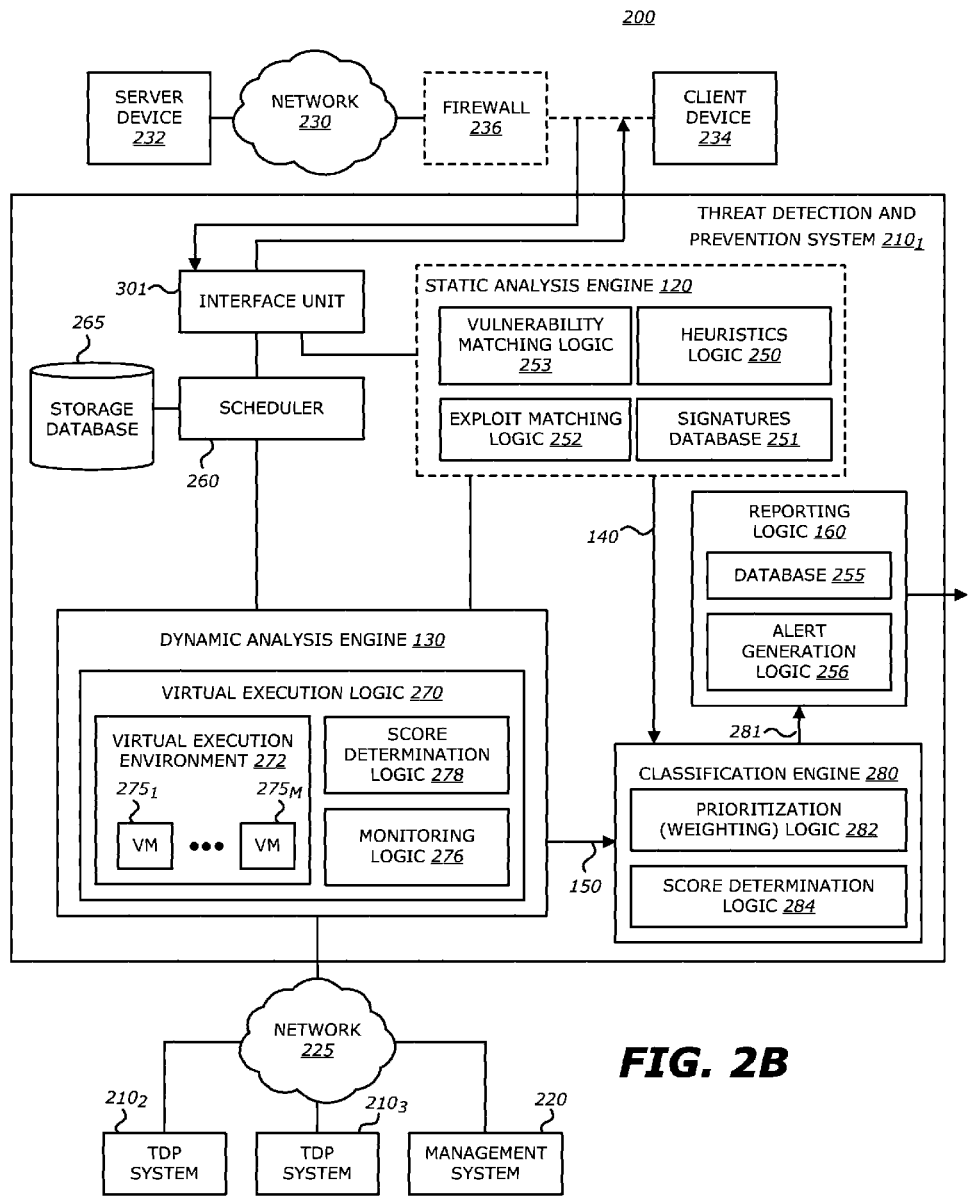
FIG. 2B is a second exemplary block diagram of a communication system deploying a plurality of threat detection and prevention (TDP) systems communicatively coupled to a management system via a network.

As shown, the first TDP system $210_1$ may be communicatively coupled with the communication network 230 via a network interface 238. In general, the network interface 238 operates as a data capturing device (sometimes referred to as a "tap" or "network tap") that is configured to receive data propagating to/from the client device 234 and provide at least some of this data to the first TDP system $210_1$. Alternatively, as shown in FIG. 2B, the first TDP system $210_1$ may be positioned behind the firewall 236 and in-line with client device 234.

According to one embodiment of the disclosure, the network interface 238 is capable of receiving and routing objects associated with network traffic to the first TDP system $210_1$. The network interface 238 may provide the entire object or certain content within the object, for example, one or more files that are part of a set of flows, packet payloads, or the like. In some embodiments, although not shown, network interface 238 may be contained within the first TDP system $210_1$.

It is contemplated that, for any embodiments where the first TDP system $210_1$ is implemented as a dedicated appliance or a dedicated computer system, the network interface 238 may include an assembly integrated into the appliance or computer system that includes a network interface card and related logic (not shown) for connecting to the communication network 230 to non-disruptively "tap" network traffic propagating through firewall 236 and provide either a duplicate copy of at least a portion of the network traffic or at least a portion the network traffic itself to the dynamic analysis engine 130 and the optional static analysis engine 120, if included within the TDP system $210_1$. In other embodiments, the network interface 238 can be integrated into an intermediary device in the communication path (e.g., firewall 236, router, switch or other networked network device, which in some embodiments may be equipped with Switched Port Analyzer "SPAN" ports) or can be a stand-alone component, such as an appropriate commercially available network tap. In virtual environments, a virtual tap (vTAP) can be used to duplicate files from virtual networks.

As further shown in FIG. 2A, the first TDP system $210_1$ comprises the optional static analysis engine 120, a scheduler 260, a storage device 265, the dynamic analysis engine 130, a classification engine 280 and the reporting logic 160.

In some embodiments, as shown in FIGS. 2A-2B, the static analysis engine 120 may include one or more software modules that, when executed by one or more processors, performs static scanning on a particular object, namely heuristics, exploit signature checks and/or vulnerability signature checks for example. The static analysis engine 120 and the dynamic analysis engine 130 may be one or more software modules executed by the same processor or different processors, where these different processors may be located within the same processor package (e.g., different processor cores) and/or located at remote or even geographically remote locations that are communicatively coupled (e.g., by a dedicated communication link) or a network.

More specifically, as shown, static analysis engine 120 may be configured with heuristics logic 250, exploit matching logic 252, and/or vulnerability matching logic 253. Heuristics logic 250 is adapted for analysis of certain portions of an object under analysis to determine whether any portion corresponds to either (i) a "suspicious" identifier such as either a particular Uniform Resource Locator "URL" that has previously been determined as being associated with known exploits, a particular source or destination OP or MAC) address that has previously been determined as being associated with known exploits; (ii) a particular exploit pattern; or (iii) a particular shellcode pattern. When deployed, the exploit matching logic 252 may be adapted to perform exploit signature checks, which may involve a comparison of an object under analysis against one or more pre-stored exploit signatures (e.g., pre-configured and pre-determined attack patterns) from signature database 251. Additionally or in the alternative, the static analysis engine 120 may be configured with vulnerability matching logic 253 that is adapted to perform vulnerability signature checks, namely a process of uncovering deviations in messaging practices set forth in applicable communication protocols (e.g., HTTP, TCP, etc.). The term "signature" designates an indicator of a set of characteristics and/or behaviors exhibited by one or more exploits that may not be unique to those exploit(s). Thus, a match of the signature may indicate to some level of probability, often well less than 100%, that an object constitutes an exploit. In some contexts, those of skill in the art have used the term "signature" as a unique identifier or "fingerprint," for example, of a specific virus or virus family (or other exploit), which is generated for instance as a hash of its machine code, and that is a special sub-case for purposes of this disclosure.

The score determination logic 278 (which will be discussed in further detail below) may be implemented within the static analysis engine 120 to generate a score that represents a probability (or level of confidence) that the object under analysis is associated with a malicious attack. For instance, the score may be based, at least in part, on (i) pattern matches; (ii) heuristic or determinative analysis results; (iii) analyzed deviations in messaging practices set forth in applicable communication protocols (e.g., HTTP, TCP, etc.); (iv) analyzed compliance with certain message formats established for the protocol (e.g., out-of-order commands); and/or (v) analyzed header or payload parameters to determine compliance. Where the score exceeds a prescribed value, the object under analysis is deemed "suspicious"; and where it exceeds another, higher prescribed value, the object under analysis may be classified as malware.

The classification engine 280 may be configured to receive the static-based results 140 (e.g., results from static analysis, metadata associated with the incoming network traffic, etc.) and/or the VM-based results 150. According to one embodiment of the disclosure, the classification engine 280 comprises prioritization logic 282 and score determination logic 284. The prioritization logic 282 may be configured to apply weighting to results provided from dynamic analysis engine 130 and/or static analysis engine 250. Thereafter, the classification engine 280 may route the classification results 281 comprising the weighting and/or prioritization applied to the static-based results 140 and/or the VM-based results 150 to the reporting logic 160. The classification results 281 may, among others, classify any malware and/or exploits detected into a family of malware and/or exploits, describe the malware and/or exploits and provide the metadata associated with any object(s) within which the malware and/or exploits were detected. The alert generation logic 256 of the reporting logic 160 may generate an alert for the client device 234 and/or route the alert to the management system 220 via the network 225 for further analysis by a network administrator. In addition, the reporting logic 160 may store the classification results 281 (including the static-based results 140 and the VM-based results 150) in the database 255 for future reference.

The static analysis engine 120 may route suspicious objects (and, in many cases, even previously classified malicious objects) to the virtual execution logic 270 within dynamic analysis engine 130. The dynamic analysis engine 130 is configured to provide more in-depth analysis of objects included in the received network traffic and/or suspicious object(s) from the static analysis engine 120 by analyzing the content of the object(s) as well as the memory allocation for an application processing the object(s).

More specifically, if the optional static scanning is conducted, upon its completion, the static analysis engine 120 may provide a suspicious object to the dynamic analysis engine 130 for in-depth dynamic analysis using virtual machines (VMs) $275_1$-$275_M$ (M≥1). For instance, the dynamic analysis engine 130 may simulate transmission and/or receipt of packets or other objects by a destination device comprising the virtual machine. In one embodiment, if the object is not suspected of being an exploit, the static analysis engine 120 may simply denote that the object is non-malicious and no further analysis is conducted.

According to one embodiment, one or more VMs $275_1$-$275_M$ within the virtual execution environment 272 may be configured each with one or more of the software profiles corresponding to the software images stored within storage device 265. Alternatively, the VMs $275_1$-$275_M$ may be configured according to a prevalent software configuration, software configuration used by a network device within a particular enterprise network (e.g., client device 234), or an environment that is associated with the object to be processed, including software such as a web browser application, PDF™ reader application, or the like. However, for a known vulnerability which occurs after a successful match during a vulnerability signature check for example, the VMs $275_1$-$275_M$ may be more narrowly configured to software profiles associated with vulnerable software. For example, a particular version of an application may be used by the VMs $275_1$-$275_M$.

The scheduler 260 may be adapted to configure the multiple VMs $275_1$-$275_M$ for concurrent virtual execution of a variety of different versions of the software in efforts to detect whether an object included within the received network traffic is attempting to utilize a heap spray attack. Of course, it is contemplated that the VM configuration described above may be handled by logic other than the scheduler 260. For instance, although not shown, the static analysis engine 120 and/or dynamic analysis engine 130 may include configuration logic to handle VM configuration as well.

The dynamic analysis engine 130 is adapted to execute one or more VMs $275_1$-$275_M$ to detect an attempt to utilize a heap spray attack by simulating the execution of an object under analysis within a run-time environment as expected by the type of object. For example, the dynamic analysis engine 130 analyzes the received network traffic and determines which application is suitable for executing an object of the received network traffic within one or more VMs $275_1$, . . . , and/or $275_M$. The monitoring logic 276 instantiates an instance of the application within the virtual execution environment 272 to open/execute the object. The monitoring logic 276 monitors the allocation of memory for the application and is equipped with a software agent or other executable module located within the virtual environment. The software agent or other executable module operates in conjunction with the application instance 310 (i.e., process) to obtain information and perform various tasks for the monitoring logic 276 such as, among others, detecting activities initiated by the application 310 and obtaining information required in detecting potential shellcode and/or anomalous behavior indicative of an exploit.

Figure 9:
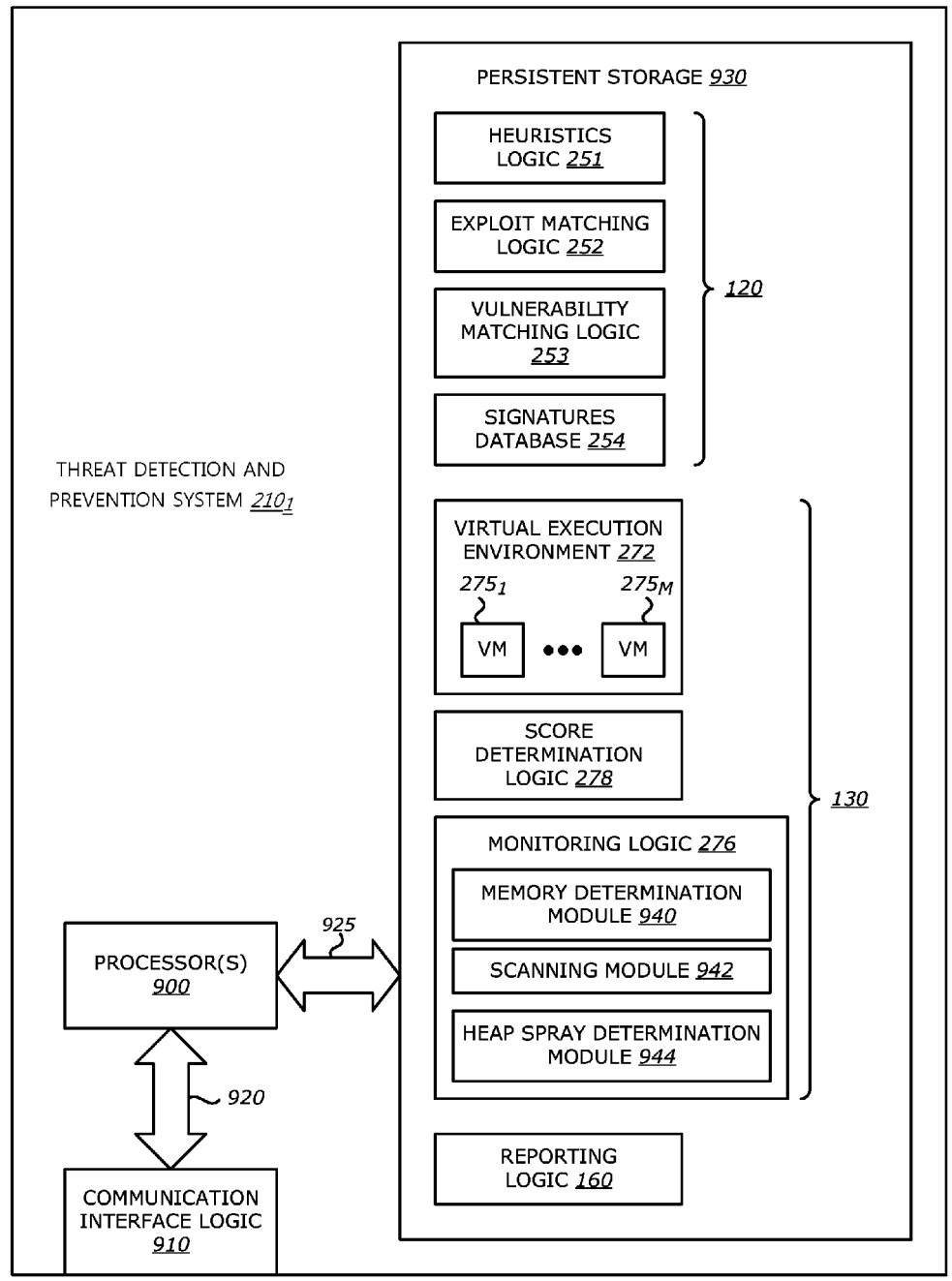
FIG. 9 is an exemplary block diagram of logic associated with the threat detection and prevention (TDP) system of FIGS. 2A-2B.

Furthermore, in one embodiment, the monitoring logic 276 may be implemented as one or more software modules. For instance, as is seen in FIG. 9, the monitoring logic 276 may comprise a memory determination module 940 to determine whether an amount of memory allocated for an application exceeds a predetermined threshold over a predetermined time interval, a scanning module 942 to scan the region of allocated memory for a pattern of instructions in response to determining the amount of allocated memory exceeds the predetermined threshold, and a heap spray determination module 944 to determine, based on the scanning, whether characteristics of a heap spray attack have been detected.

Figure 3:
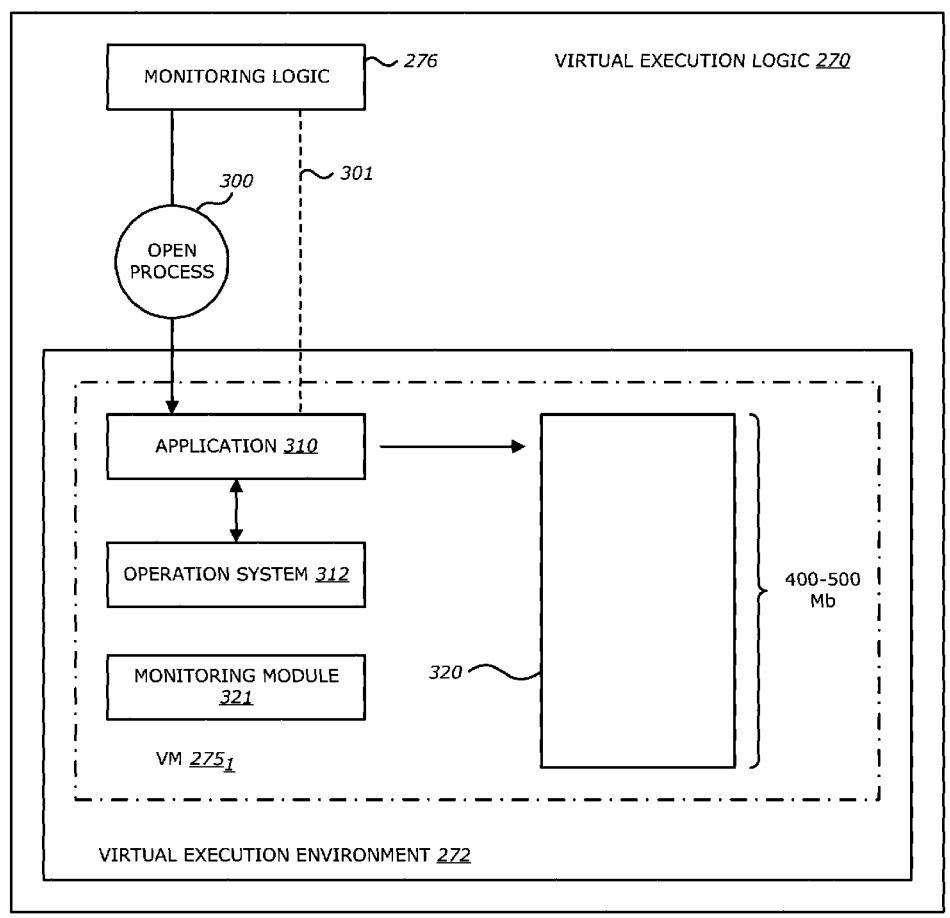
FIG. 3 is an exemplary block diagram of a monitoring logic to monitor the allocation of virtual memory for an application within a virtual machine (VM).

Referring to FIG. 3, an exemplary block diagram of the monitoring logic 276 to monitor the allocation of virtual memory for an application within a VM $275_1$ is shown. In the embodiment shown, virtual execution logic 270 is shown to include the monitoring logic 276, a score determination logic 278 and virtual execution environment 272 containing VM $275_1$. In the illustration, the monitoring logic 276 opens an instance of an application 310 (for example, a browser such as Internet Explorer®) through an open process operation 300. The open process operation 300 creates a handle 301 which enables the monitoring logic 276 to monitor the memory allocated for application 310. The monitoring logic 276 may then obtain information about virtual memory allocated for the application 310 through the use of queries, such as a Windows® system call for example. Examples of information the queries may return include, but are not limited or restricted to, (i) the size of the region of virtual memory allocated, (ii) the size of particular blocks of memory within the region of virtual memory allocated, (iii) addresses of particular blocks of memory within the region of virtual memory allocated, and/or (iv) the permissions of particular blocks of memory within the region of virtual memory allocated (wherein the permissions may include whether the block of memory is set in a read, write, and/or executable permission).

The monitoring logic 276 observes the application 310 as it allocates a "virtual" heap 320 within VM $275_1$. The monitoring logic 276 is equipped with a monitoring module 321, e.g., located within the virtual environment, which operates in conjunction with the application instance 310 (i.e., process) to obtain information and perform various tasks for the monitoring logic 276. Examples of tasks performed by the monitoring module 321 include, but are not limited to, performing function call observing (i.e., performs an operation referred to as "hooking" or "intercepting"), detecting potential shellcode, detecting return-oriented programming (ROP), detecting NOP sleds and scanning the allocated virtual heap 320 for patterns not appearing on the blacklist (e.g., "unknown" patterns) to be "learned" such that the previously unknown pattern is added to a pattern blacklist (to be discussed below).

If the allocation of memory exceeds a predetermined threshold, the monitoring logic 276 observes the allocated memory over a predefined time interval. If the allocated memory remains above the predefined threshold for the entirety of the interval, the monitoring logic 276 concludes that the object includes a heap spray attack. The portion of the monitoring logic performing functionalities described above and/or below may be referred to "heap spray detection logic."

Figure 4A:
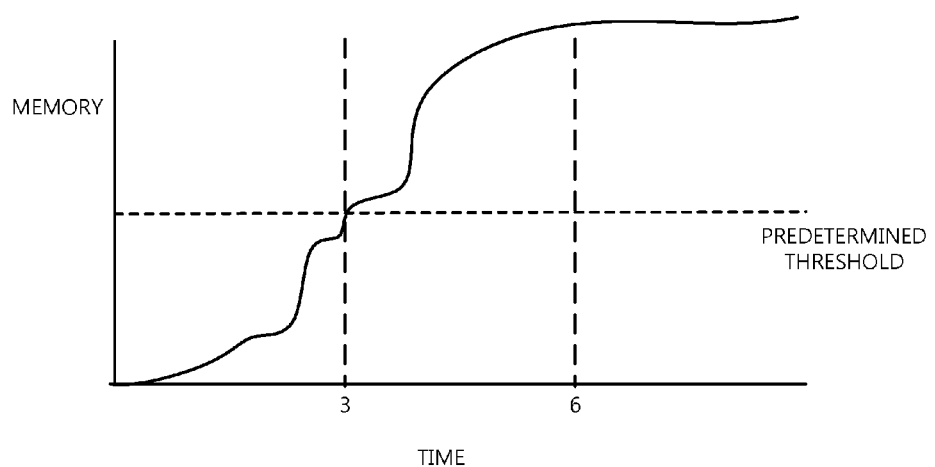
FIG. 4A is an exemplary graph plotting time over memory illustrating the memory allocation for an instance of an application executing in a virtual machine (VM).

Referring to FIG. 4A, an exemplary graph plotting time over memory illustrating the memory allocation for an instance of an application executing in a virtual machine is shown. In FIG. 4A, the allocation of memory exceeds a predefined threshold when time equals 3 seconds, for example. The predefined threshold may be variable. The allocation of memory exceeds the threshold for the entirety of a time interval (for example, Interval 1 is 3-6 seconds in duration). Based on the graph depicted in FIG. 4A, the monitoring logic 276 observing the memory allocation would assign a memory allocation score to the object, the memory allocation score signifying a first probability that the object that made the call is associated with a heap spray attack.

Figure 4B:
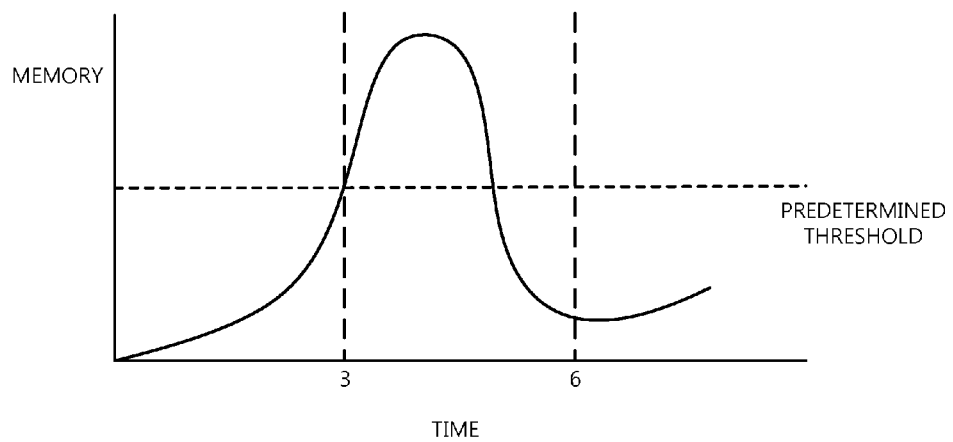
FIG. 4B is a second exemplary graph plotting time over memory illustrating the memory allocation for an instance of an application executing in a virtual machine (VM).

Referring to FIG. 4B, a second exemplary graph plotting time over memory illustrating the memory allocation for an instance of an application executing in a virtual machine is shown. In FIG. 4B, the allocation of memory exceeds a predetermined threshold when time equals 3 seconds. In contrast to FIG. 4A, the allocation of memory does not exceed the threshold for the entirety of the interval (e.g., Interval 2 is 3-6 seconds in duration). Based on the graph depicted in FIG. 4B, the monitoring logic 276 observing the memory allocation would disregard the event of the memory allocation initially exceeding the threshold and not assign a memory allocation score to the object based on the memory allocation for the application (or alternatively would assign a memory allocation score of zero).

As an example, the monitoring logic 276 may determine that a PDF file is included within the received network traffic and therefore instantiate an instance of Adobe® Reader®. The monitoring logic 276 opens the PDF file using Adobe® Reader® within virtual execution environment 272 and monitors the amount of memory allocated for Adobe® Reader®. If the amount of memory allocated exceeds a predetermined threshold for the entirety of a prescribed time interval, such as a three (3) second interval for example, the monitoring logic 276 concludes that the PDF file includes a heap spray attack. The monitoring logic 276 may then assign a memory allocation score indicating a potential heap spray attack to the object. However, if the allocated memory dips below the predetermined threshold during the prescribed time interval, the monitoring logic 276 disregards the event (the allocated memory exceeding the predetermined threshold) as a mere spike in allocated memory for an action such as downloading a large image over the network 230 (or alternatively, or in addition, assign a memory allocation score of zero).

When a heap spray attack is initially determined to be present in the object based on the memory allocation for an application used to execute the object, the monitoring logic 276 may scan the allocated memory for patterns appearing on a predetermined blacklist. Based on the information obtained from queries about the allocated virtual memory, the monitoring logic 276 may exclude certain portions of the allocated virtual heap 320. For example, the monitoring logic 276 may exclude those blocks of memory having their permissions set to "read" and execute only as a heap spray attack will only insert code into blocks of memory having permission set to, at least, "write." Therefore, if a block of memory not having permissions set to, at least, "write," the monitoring logic 276 may exclude that block of memory from its scan as code that is part of a heap spray attack will not have been injected into that block of memory. This allows the monitoring logic 276 to increase the efficiency of the scan.

Figure 5:
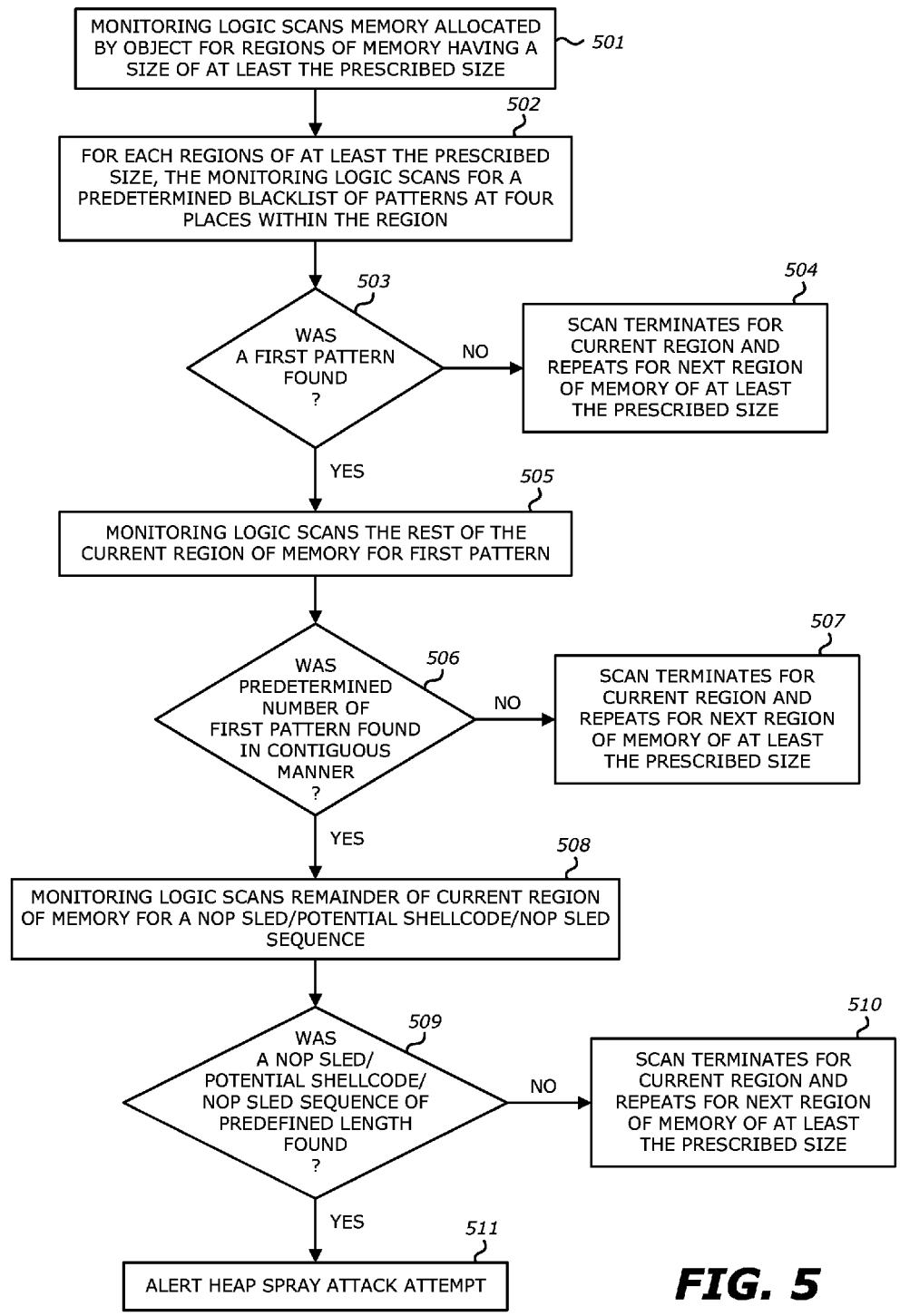
FIG. 5 is a flowchart of an exemplary method for detecting a heap spray attack based on the detection of a blacklisted pattern.

Referring to FIG. 5, a flowchart of an exemplary method for detecting a heap spray attack based on the detection of a blacklisted pattern is shown. In block 501, once a heap spray attack is determined to be present in an object, the monitoring logic 276 scans the memory allocated for the object for regions of memory at least a predetermined size (FIG. 5 uses a prescribed size of, for example, 128 kilobytes (Kb), though other sizes may be used in some embodiments). In block 502, for each region of memory of at least the prescribed size, the monitoring logic 276 scans for a pattern appearing on a predetermined blacklist of patterns at a predefined number of positions within the region of memory. The predefined number may be set to any value, such as, for example, three or four, where the predefined number is a static value or variable.

If a blacklisted pattern is not found (no at block 503), the scan ends for the current region and the monitoring logic 276 proceeds to analyze the next region of memory of at least the prescribed size (block 504). If a blacklisted pattern is detected (yes at block 503), the monitoring logic 276 scans the rest of the current region for the detected pattern (the "first pattern") (block 505).

Thereafter, if a predetermined number of the first pattern is not found in a contiguous manner (no at block 506), the scan ends for the current block and the monitoring logic 276 proceeds to analyze the next block of memory of at least the prescribed size (block 507). However, if a predetermined number of the first pattern is found in a contiguous manner (yes at block 506), the monitoring logic 276 scans the remainder of the current block of memory for a sequence including a NOP sled followed by potential shellcode followed by another NOP sled (herein referred to as a "NOP sled/potential shellcode/NOP sled sequence") (block 508). The NOP sleds are a contiguous repetition of the first pattern, and the potential shellcode represents an interruption in the sequence of NOP sleds. Alternatively, the monitoring logic 276 may scan the current block of memory for a predefined number of NOP sleds instead of a NOP sled/potential shellcode/NOP sled sequence length. If a NOP sled/potential shellcode/NOP sled sequence of a predefined length is not found (no at block 509), the scan ends for the current block and the monitoring logic 276 proceeds to analyze the next block of memory of at least the prescribed size (block 510). If a NOP sled/potential shellcode/NOP sled sequence of a predefined length is found (yes at block 509), an alert signaling the presence of a heap spray attack in the object is generated (block 511).

Figure 6A:
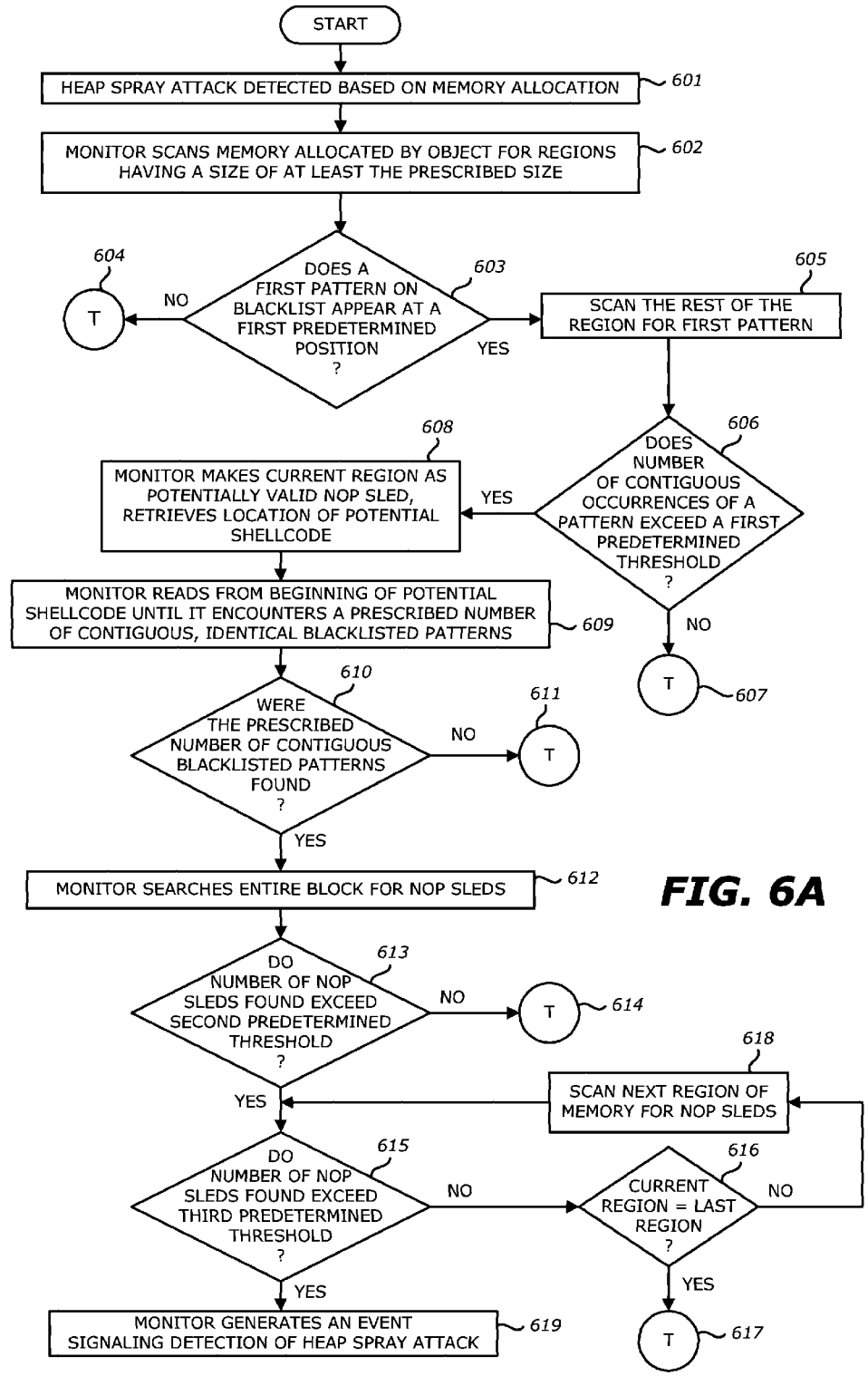
FIGS. 6A-6D are flowcharts illustrating an in-depth exemplary method for detecting a heap spray attack based on the detection of a blacklisted pattern.

Referring to FIGS. 6A-6D, flowcharts illustrating an in-depth exemplary method for detecting a heap spray attack based on the detection of a blacklisted pattern are shown. As shown in FIG. 6A, in block 601, the analysis of an object begins as a result of an initial detection of a heap spray attack based on the memory allocation for an application over a predefined time interval used to execute the object. In block 602, the monitoring logic 276 scans the memory allocated for the object within the virtual execution environment 272 (as discussed above) for blocks of memory of at least a predetermined size.

Upon detecting one or more blocks of memory of at least a predetermined size, the monitoring logic 276 scans each block of memory of at least a predetermined size at four predefined positions to locate a blacklisted pattern, unless the monitoring logic 276 has concluded that a heap spray attack is present in the object prior to such scanning. Of course, as stated above, the number of predefined positions may vary and, as an illustrative example, four predefined positions are used in FIG. 6A.

In block 603, the monitoring logic 276 determines whether a blacklisted pattern appears at a first predefined position within a first block of memory of at least a predetermined size. The monitoring logic 276 will search the blocks of memory at the predefined positions in sections having a size corresponding to the length of the pattern(s) on the blacklist. The size of each section is referred to as the "search block size". For example, the search block size may be four bytes when the client device 234 of FIG. 2A or 2B is running on a 32-bit operating system.

In one embodiment, a first predefined position is located within a predefined range of memory following the header such that the first predefined position begins at an address that is offset by a multiple of the search block size from the beginning of the entire region of allocated memory. If no blacklisted pattern appears at the first predefined position, the monitoring logic 276 proceeds to analyze a second predefined position (block 604), which will be discussed below.

If a blacklisted pattern is detected at the first predefined position (yes at block 603), the monitoring logic 276 scans the rest of the block of memory for the detected pattern (position 605). When the monitoring logic 276 has finished scanning the block of memory, if the number of contiguous occurrences of the detected pattern does not exceed a first predetermined threshold (no at block 606), the monitoring logic 276 proceeds to analyze the second predefined position (block 607). If the number of occurrences does exceed the first predetermined threshold (yes at block 606), the monitoring logic 276 marks that the current block of memory includes a potentially valid NOP sled and retrieves the location of potential shellcode (block 608). After retrieving the location of the potential shellcode, the monitoring logic 276 reads from the beginning of the potential shellcode until it encounters at least a predetermined number of contiguous blacklisted patterns (block 609). This would indicate the end of the potential shellcode and the beginning of a NOP sled, thereby forming a NOP sled/potential shellcode/NOP sled sequence. FIG. 6A sets the predetermined number of contiguous blacklisted patterns at two as an example.

If the monitoring logic 276 does not encounter at least the predetermined number of contiguous blacklisted patterns (no at block 610), the monitoring logic 276 proceeds to analyze the second predefined position (block 611). However, if at least the predetermined number of contiguous blacklisted patterns are detected (yes at block 610), the monitoring logic 276 searches the entire block of memory for NOP sleds that include a known pattern (block 612). If the number of NOP sleds detected does not exceed a second predetermined threshold (no at block 613), the monitoring logic 276 proceeds to analyze the second predefined position (block 614). However, if the number of NOP sleds detected is at least equal to the second predetermined threshold (yes at block 613), the monitoring logic determines whether the number of detected NOP sleds is at least equal to a third predetermined threshold (block 615). In an alternative embodiment, the monitoring logic 276 may determine whether the length of a NOP sled/potential shellcode/NOP sled sequence exceeds a predetermined length threshold as compared to determining whether the number of detected NOP sleds exceeds a second predetermined threshold.

If the third predetermined threshold is not met (no at block 615), the monitoring logic 276 determines whether the current block of memory is the last block of memory of at least a predetermined size (block 616). If the current block is the last block of memory of at least a predetermined size (yes at block 616), the monitoring logic 276 proceeds to analyze the second predefined position (block 617). However, if current block of memory is not the last block of memory of at least a predetermined size (no at block 616), the monitoring logic 276 scans the next block of memory of at least the predetermined size for NOP sleds to the current block of memory (block 618). The monitoring logic 276 then loops back to block 615 to evaluate whether the number of NOP sleds found exceeds the third predetermined threshold. If the third predetermined threshold is satisfied (yes at block 615), the monitoring logic 276 generates an event signaling detection of a heap spray attack (block 619). The monitoring logic 276 may assign a blacklist pattern score to the object after determining a heap spray attack may be included in the object based on detection of a NOP sled pattern appearing on the pattern blacklist, the blacklist pattern score signifying a second probability that the object that made the call is associated with a heap spray attack.

Figure 6B:
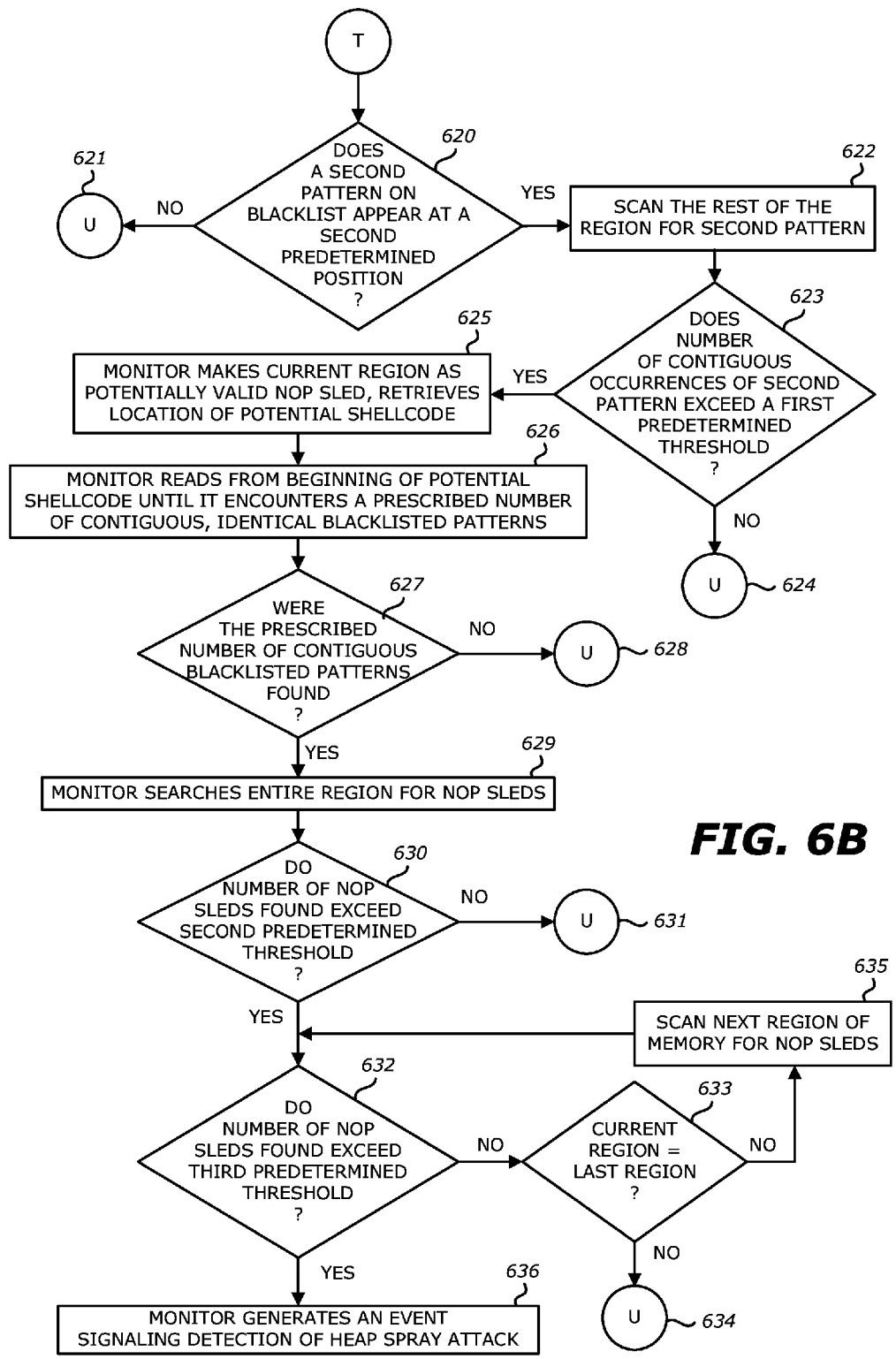
Figure 6C:
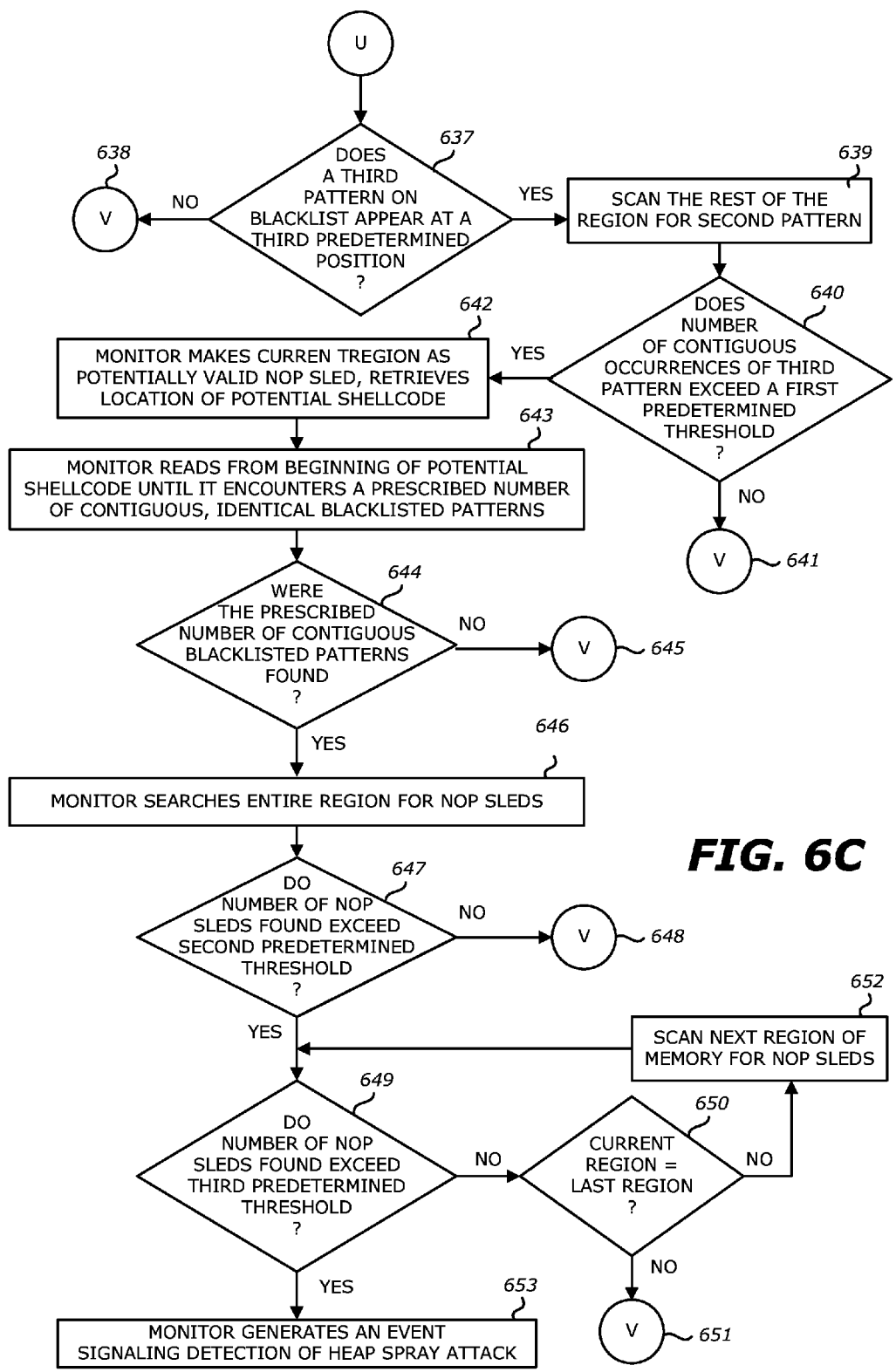

Referring to FIG. 6B, a flowchart illustrating the continuation of the in-depth exemplary method for detecting a heap spray attack based on the detection of a blacklisted pattern as depicted in FIG. 6A is shown. In FIG. 6B, the method illustrated mirrors that as described above in accordance with FIG. 6A; however, upon determining a need to terminate the search at the second predefined position, the monitoring logic 276 moves to a third predefined position and continues the scan to locate a blacklisted pattern (as shown in FIG. 6C). In addition, the second predefined position is located at an address that is offset by a multiple of the search block size from the beginning of the entire region of allocated memory, such that predefined position two is offset further in the region of allocated memory than the first predefined position. For example, the second predefined position may be the address that is offset by 512 Kb from the beginning of the region of allocated memory.

Figure 6D:
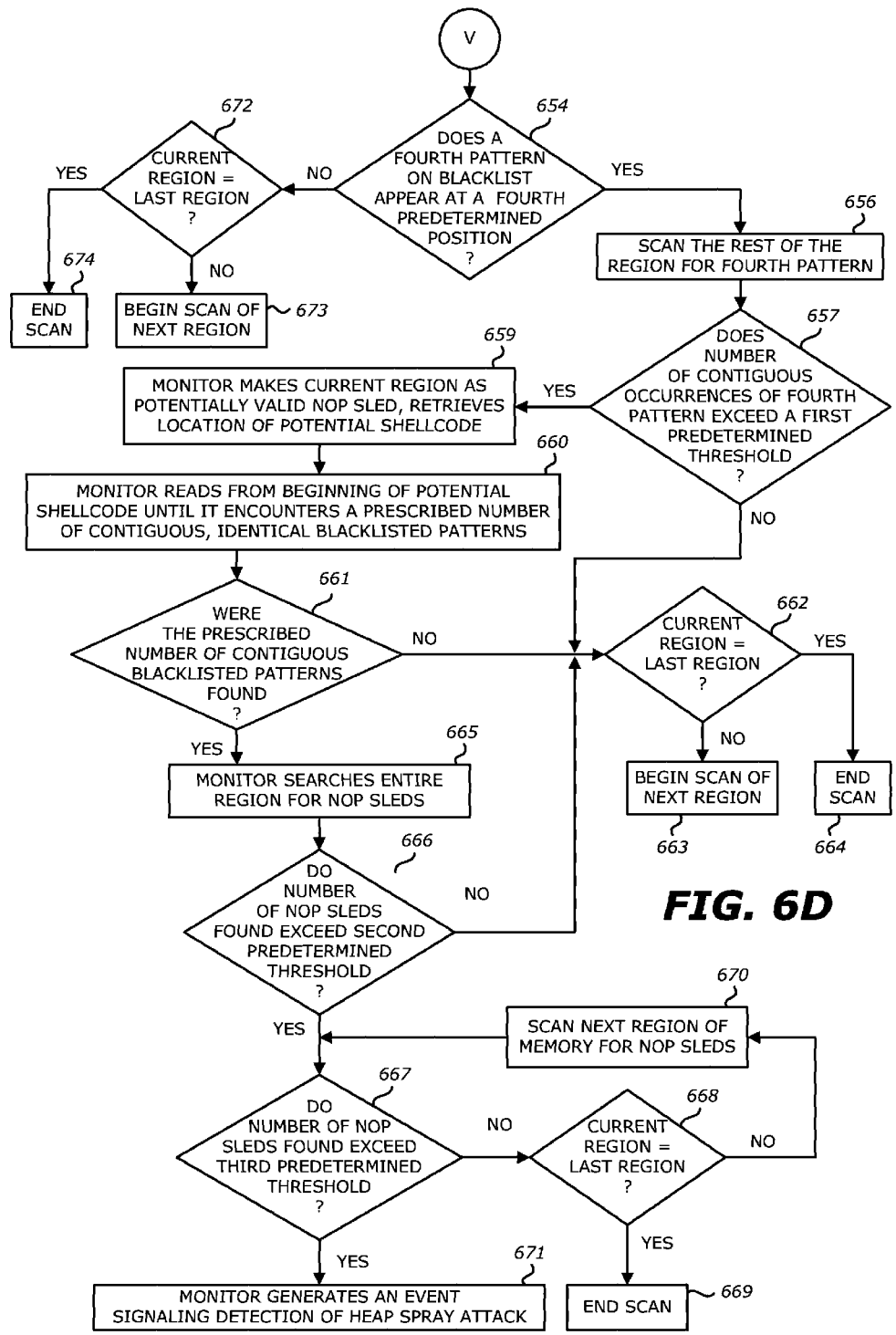

Referring to FIG. 6C, a flowchart illustrating the continuation of the in-depth exemplary method for detecting a heap spray attack based on the detection of a blacklisted pattern as depicted in FIGS. 6A-6B is shown. In FIG. 6C, the method illustrated mirrors that as described above in accordance with FIGS. 6A-6B; however, upon determining a need to terminate the search at the third predefined position, the monitoring logic 276 proceeds to analyze a fourth predefined position (as shown in FIG. 6D). In addition, the third predefined position is the address that is offset by the search block size from the end of the entire region of allocated memory. For example, the monitoring logic 276 analyzes the last four bytes of allocated memory if the client device 234 is running on a 32-bit operating system.

Referring to FIG. 6D, a flowchart illustrating the continuation of the in-depth exemplary method for detecting a heap spray attack based on the detection of a blacklisted pattern as depicted in FIGS. 6A-6C is shown. In FIG. 6D, the method illustrated mirrors that as described above in accordance with FIGS. 6A-6C; however, the fourth predefined position is located at an address that is offset by a multiple of the search block size from the end of the entire region of allocated memory. For example, the second predefined position may be the address that is offset by 512 Kb from the end of the region of allocated memory. In addition, upon determining the search should be terminated at the fourth predefined position, the monitoring logic 276 terminates the scan and concludes that a heap spray attack is not present in the object. Thereafter, the monitoring logic 276 may then disregard the partial scan and/or assign a blacklist pattern score of zero to the object. However, if the monitoring logic 276 detects a heap spray attack based on the method illustrated in FIGS. 6A-6D, the monitoring logic 276 may assign a blacklist pattern score to the object.

Although the monitoring logic 276 scans for blacklisted patterns when a heap spray attack is detected based on the memory allocation over a predefined time interval for an application. A NOP sled pattern included in the heap spray attack may go undetected if a pattern that does not appear on the blacklist is included in the exploit. Therefore, a method for detecting new NOP sled patterns has been derived. Furthermore, upon detecting a new NOP sled pattern, the monitoring logic 276 may add the detected new NOP instruction comprising the new NOP sled pattern to the blacklist of patterns, as discussed above. Thus, the monitoring logic 276 has effectively learned a new pattern; therefore, the detection of a new NOP instruction comprising a NOP sled and addition of the detected new NOP instruction to the blacklist of NOP instructions constitutes pattern learning.

Figure 7:
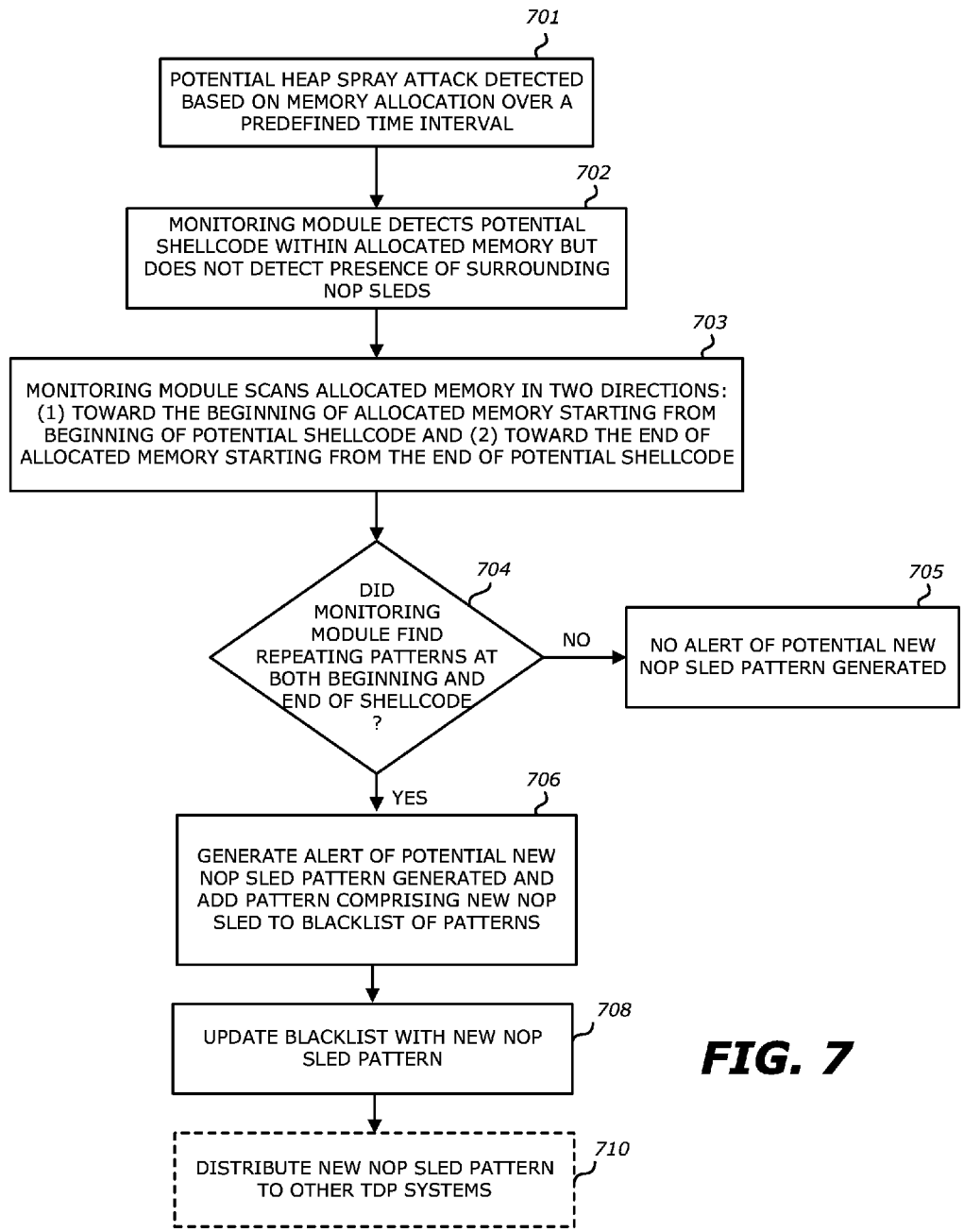
FIG. 7 is a flowchart of an exemplary method for detecting a new NOP sled pattern.

Referring to FIG. 7, a flowchart of an exemplary method for detecting a new NOP sled pattern using a technique referred to as "pattern learning" is shown. In block 701, the presence of a heap spray attack has been detected based on the memory allocation over a predefined time interval for an application used to execute an object included in the received network traffic. In block 702, the monitoring module 321, which is operating in conjunction with the monitoring logic 276 (see FIG. 3), detects potential shellcode within the allocated virtual heap 320 but does not detect NOP sleds surrounding the potential shellcode and reports this to the monitoring logic 276.

In block 703, the monitoring module 321 retrieves the location of the potential shellcode and scans the allocated memory in two directions: (1) toward the beginning of the allocated memory starting from the beginning of the potential shellcode, and (2) toward the end of the allocated memory starting from the end of the potential shellcode. If the monitoring module 321 does not find a repeating pattern at both the beginning and end of the potential shellcode (no at block 704), no alert of a new NOP sled pattern is generated (block 705). Alternatively, the monitoring logic 276 may assign a new NOP sled pattern score of zero to the object. However, if the monitoring module 321 finds a repeating pattern at both the beginning and end of the potential shellcode (yes at block 704), an alert signaling that a new NOP sled pattern has been detected may be generated (block 706). In addition, the monitoring logic 276 may assign a new NOP sled pattern score to the object, the new NOP sled pattern score signifying a third probability that the object is associated with a heap spray attack.

In an alternative embodiment, the pattern comprising the new NOP sled pattern is not automatically added to the blacklist of patterns but the alert that is generated is received by the appropriate network administrator (such as the network administrator of the company employing the user of the network device that generated the alert). The network administrator may then determine whether the pattern comprising the potential new NOP sled pattern is actually a pattern likely to be associated with a heap spray attack or whether the alert was generated as a result of a false positive. In one embodiment, if the pattern comprising the potential new NOP sled pattern is determined to likely be associated with a heap spray attack, a configuration file may be created including the new pattern on the blacklist of patterns and the configuration file distributed among one or more network devices. For example, if the network administrator determines the potential new NOP sled pattern should be added to the blacklist of patterns, the network administrator may develop a configuration file including the new pattern on the blacklist and distribute the configuration file to all network devices (TDP systems and/or client devices) deploying the heap spray detection logic.

Figure 8:
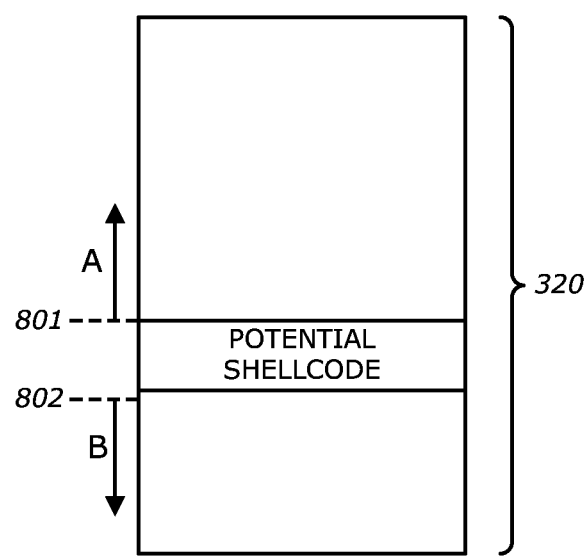
FIG. 8 is an exemplary block diagram of a virtual heap allocated for an application executing an object included in received network traffic.

Referring to FIG. 8, an exemplary block diagram of a virtual heap allocated for an application executing an object included in received network traffic is shown. FIG. 8 illustrates block 703 of FIG. 7 (discussed above). Upon detecting the presence of potential shellcode but without detecting the presence of a NOP sled consisting of a known pattern, the monitoring module 321 retrieves the location of the beginning of the potential shellcode (location 801). The monitoring module 321 then scans the allocated virtual heap 320 for one or more repeating patterns. The scanning is done in two directions represented by (A) and (B) in FIG. 8. Direction A illustrates the monitoring module 321 scanning the allocated virtual heap 320 from the beginning of the potential shellcode, location 801, toward the beginning of the allocated memory. Direction B illustrates the monitoring module 321 scanning the allocated virtual heap 320 from the location in the allocated virtual heap 320 just past the end of the potential shellcode, location 802, toward the end of the allocated virtual heap 320.

Referring back to FIG. 2A, the score determination logic 278 within the dynamic analysis engine 130 may be configured to compute a score based on the execution of the application within the one or more VMs $275_1, \ldots,$ and/or $275_M$. According to one embodiment of the disclosure, the score determination logic 278 comprises one or more software modules that are used to determine a probability (or level of confidence) that the object contains or may instigate a heap spray attack based on an observed "event" (i.e., behavior, such as, for example, a request for memory allocation, detected pattern, etc.) in the runtime environment. As discussed above, the score determination logic 278 may assign one or more of (i) a memory allocation score based on the memory allocation for an application used to execute an object, (ii) a blacklist pattern score based on a detected pattern appearing on a blacklist of patterns, and/or (iii) a new NOP sled pattern score based on a detected new NOP sled pattern. Of course, an overall score may be assigned to the object as a whole by mathematically combining the scores determined by analysis of different content associated with the same object to obtain an overall score for that object. The scores may be given equal weighting or the weighting for one or more observed features (e.g., memory allocation, detected pattern, etc.) may differ from another due to the probability that the observed features are associated with a heap spray attack and the likelihood of a false positive.

According to one embodiment of the disclosure, the overall score, or one or more of (i) a memory allocation score, (ii) a blacklist pattern score, and/or (iii) a new NOP sled pattern score may be used, at least in part, to determine whether the object causes or is otherwise associated with a heap spray attack. Some or all of the VM-based results 150 may be combined with its corresponding static-based results 140 in making this determination.

C. Exemplary Logic Layout of TDP System

Referring now to FIG. 9, an exemplary block diagram of logic associated with the TDP system $210_1$ of FIGS. 2A-2B is shown. The TDP system $210_1$ comprises one or more processors 900 that are coupled to the communication interface logic 910 via a first transmission medium 920. Communication interface logic 910 enables communication with other TDP systems $210_2$-$210_3$ and management system 220 of FIG. 2A-2B. According to one embodiment of the disclosure, the communication interface logic 910 may be implemented as a physical interface including one or more ports for wired connectors. Additionally, or in the alternative, communication interface logic 910 may be implemented with one or more radio units for supporting wireless communications with other network devices.

The processor(s) 900 is further coupled to the persistent storage 930 via the transmission medium 925. According to one embodiment of the disclosure, the persistent storage 930 may include (i) the static analysis engine 120 including the signatures database 254, the vulnerability matching logic 253, the exploit matching logic 252 and the heuristics logic 250; (ii) the dynamic analysis engine 130 including the virtual execution logic 272, the monitoring logic 276 and the score determination logic 278; and (iv) the reporting logic 160. Of course, when implemented as hardware, one or more of these logic units could be implemented separately from each other.

The static analysis engine 120, if included, comprises one or more software modules that conduct a first static analysis on one or more incoming objects. As described above, this analysis may involve performing at least exploit signature checks and vulnerability signature checks on each incoming object to determine whether characteristics of any of these objects are indicative of an exploit and/or a heap spray attack. Upon detection that one or more suspicious objects have characteristics of an exploit and/or a heap spray attack, the static analysis engine 120 provides the suspicious object(s) to the virtual execution logic 270.

The virtual execution environment 272 comprises one or more software modules that are used for performing an in-depth, dynamic and real-time analysis of one or more objects included in the received network traffic using one or more VMs. More specifically, the virtual execution environment 272 is adapted to run the VM(s), which virtually processes the content associated with the one or more objects by simulating execution of such content in order to determine the presence of one or more exploits and/or heap spray attacks. Furthermore, the monitoring logic 276 monitors in real-time and may also log at least the memory allocation for predefined time intervals by the VM(s) configured with certain software. The monitoring logic 276 analyzes the allocated memory to detect patterns within the allocated memory that are indicative of a heap spray attack. In essence, the monitoring logic 276 identifies the effects that the object would have had on a physical network device with the same software/feature configuration. Such effects may include, among other things, large memory allocations during a predefined time interval and execution of operations within the allocated memory that would allow for the utilization of a heap spray attack in order to make realization of an exploit within the operating system easier.

Thereafter, according to the observed behavior of the virtually executed content, the monitoring logic 276 may determine that the content is associated with one or more exploits, where the severity of the observed anomalous behavior and/or the likelihood of the anomalous behavior results from an exploit, is evaluated and reflected in a "score" assigned by the score determination logic 278. Processor(s) 900 may invoke the reporting logic 160, which produces an alert for conveying information regarding the detected heap spray attack by the TDP system $210_1$.

II. Heap Spray Detection within a Network Device

According to an alternative embodiment of the disclosure, a network device may be configured to implement at least a monitoring logic independently of a separate physical device implementing a heap spray detection logic. In other words, a network device may be configured such that it is not reliant on separate physical device to implement the heap spray detection logic.

Figure 10:
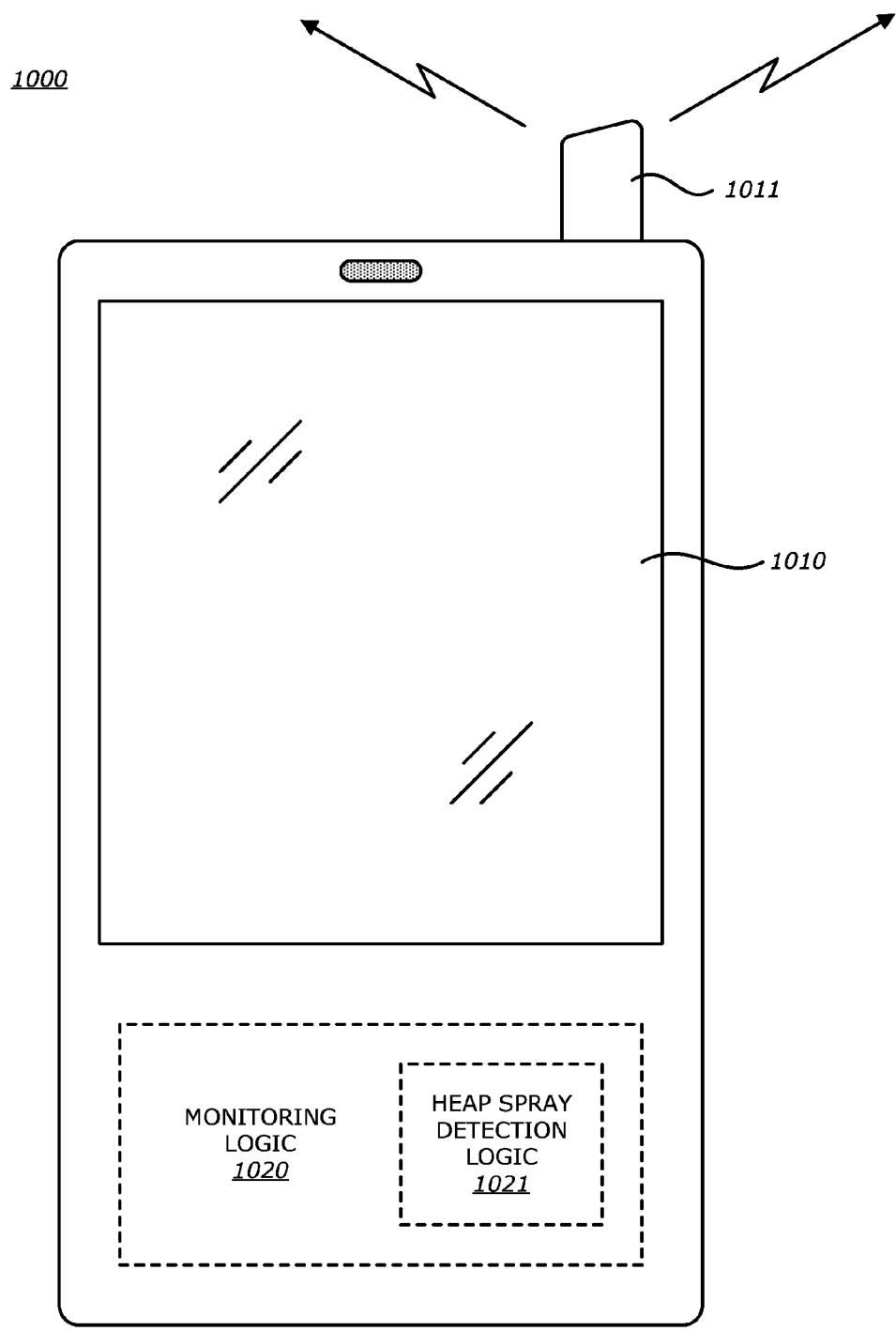
FIG. 10 is an exemplary illustration of a network device configured with a heap spray detection logic.

Referring to FIG. 10, a network device may be configured with a heap spray detection logic. In FIG. 10, for illustrative purposes, the network device is represented as a mobile network device 1000 (e.g., smartphone, tablet, laptop computer, netbook, etc.). The mobile network device 1000 includes a display screen 1010; a receiver and/or transmitter (e.g. transceiver) such as an antenna 1011; and a heap spray detection logic 1021. The heap spray detection logic 1021 includes monitoring logic 1020 which may be equipped with a monitoring module 321 for monitoring operations and other behaviors of an application 310 from within the mobile network device 1000 as described above.

In one embodiment, the heap spray detection logic 1021 may be implemented as a software service within the mobile network device 1000. In such an embodiment, the heap spray detection logic 1021 starts and performs API hooking in order to observe function calls and/or system calls. When a function call or system call is observed, the heap spray detection logic 1021 analyzes the actions taken by the mobile network device 1000 as a result of the function call or system call to determine whether the object that made the call is associated with a heap spray attack. In one embodiment, the heap spray detection logic 1021 may operate as a daemon such that the heap spray detection logic 1021 runs as a background process on the mobile network device 1000. In yet another embodiment, the heap spray detection logic 1021 may be implemented as a software application on the mobile network device 1000.

The heap spray detection logic 1021 may analyze the memory allocation for the application executing the object as a result of the function call or system call. The heap spray detection logic 1021 may analyze information such as (i) the size of the region of memory allocated, (ii) the size of particular regions of memory within the region of memory allocated, addresses of particular regions of memory within the region of memory allocated, and/or (iii) the permissions of particular regions of memory within the region of memory allocated (wherein the permissions may include whether the region of memory is set to be readable, writable, and/or executable).

The heap spray detection logic 1021 observes the application as it allocates memory for a heap. The monitoring logic 1020 is equipped with a monitoring module located within the virtual environment. The monitoring module obtains information and performs various tasks for the monitoring logic 1020 and/or the heap spray detection logic 1021 such as, among others, performing function call hooking, detecting potential shellcode, detecting return-oriented programming (ROP), detecting NOP sleds and scanning the allocated heap for patterns to be added to a pattern blacklist.

If the allocation of memory exceeds a predetermined threshold, the heap spray detection logic 1021 observes the allocated memory over a predefined time interval. If the allocated memory remains above the predefined threshold for the entirety of the predefined time interval, the heap spray detection logic 1021 concludes that the object includes a heap spray attack. Thereafter, an alert signaling that the object that made the call may be associated with a heap spray attack may be generated.

Furthermore, the heap spray detection logic 1021 may scan the memory allocated for the object for a pattern appearing on a predetermined blacklist of patterns at a predefined number of positions within each block of memory of at least a predetermined size. If a blacklisted pattern is found, the heap spray detection logic 1021 scans the rest of the current block for the found pattern (the "first pattern"). Thereafter, if a predetermined number of the first pattern is not found in a contiguous manner, the scan ends for the current block and the heap spray detection logic 1021 proceeds to analyze the next block of memory of at least the predetermined size. However, if a predetermined number of the first pattern is found in a contiguous manner, the heap spray detection logic 1021 scans the remainder of the current block of memory for a predetermined threshold of NOP sleds. If the predetermined threshold of NOP sleds is not satisfied, the scan ends for the current block and the heap spray detection logic 1021 proceeds to analyze the next block of memory of at least the predetermined size. If the predetermined threshold of NOP sleds is satisfied, an alert signaling that the object that made the call may be associated with a heap spray attack may be generated.

Finally, the heap spray detection logic 1021 may be configured to scan the allocated memory for new NOP sled patterns. If determined to likely be associated with a heap spray attack, the pattern comprising the new NOP sled pattern may be added to the blacklist of patterns (the addition of a pattern determined likely to be associated with a heap spray attack may be referred to as "pattern learning"). A monitoring module 321 may detect potential shellcode within the allocated memory but does not detect NOP sleds surrounding the potential shellcode and reports this to the heap spray detection logic 1021. The monitoring module retrieves the location of the potential shellcode and scans the allocated memory in two directions: (1) toward the beginning of the allocated memory starting from the beginning of the potential shellcode, and (2) toward the end of the allocated memory starting from the end of the potential shellcode. If the monitoring module finds a repeating pattern at both the beginning and end of the potential shellcode, an alert signaling a new NOP sled pattern has been detected may be generated. Furthermore, the pattern comprising the new NOP sled pattern may be automatically added to the blacklist of patterns included on the network device deploying the heap spray detection logic. Alternatively, if the pattern is verified to likely be associated with a heap spray attack, a configuration file may be created and distributed to all network devices that connect to network 230 and deploy the heap spray detection logic. Once downloaded on a network device, the configuration file may update the blacklist of the network device to include the new pattern. Therefore, the blacklist of each network device connecting to network 230 and deploying the heap spray detection logic may be updated automatically as new patterns likely to be associated with a heap spray attack are detected.

The one or more alerts generated may be displayed to a user on the display screen 1010. For example, when the allocated memory remains above a predefined threshold for the entirety of a predefined time interval, an alert based on the memory allocation for the application may be displayed on the display screen 1010. Such alerts may present the user with the option to remediate the detected heap spray attack locally, i.e., on the mobile network device 1000, or the option to store the information associated with the detected heap spray attack for remediation by the appropriate network administrator. One example of remediation that may occur locally is a system restore of the mobile network device 1000 to system defaults. Furthermore, the information associated with the detected heap spray attack may be transmitted via the antenna 1011 to the appropriate network administrator. In addition, as discussed above, a score may be assigned based on one or more of (i) the memory allocation for an application used to execute an object, (ii) a detected pattern appearing on a blacklist of patterns, and/or (iii) a detected new NOP sled pattern. The one or more scores may also be displayed on the display screen 1010.

III. Shellcode Validation

Figure 11:
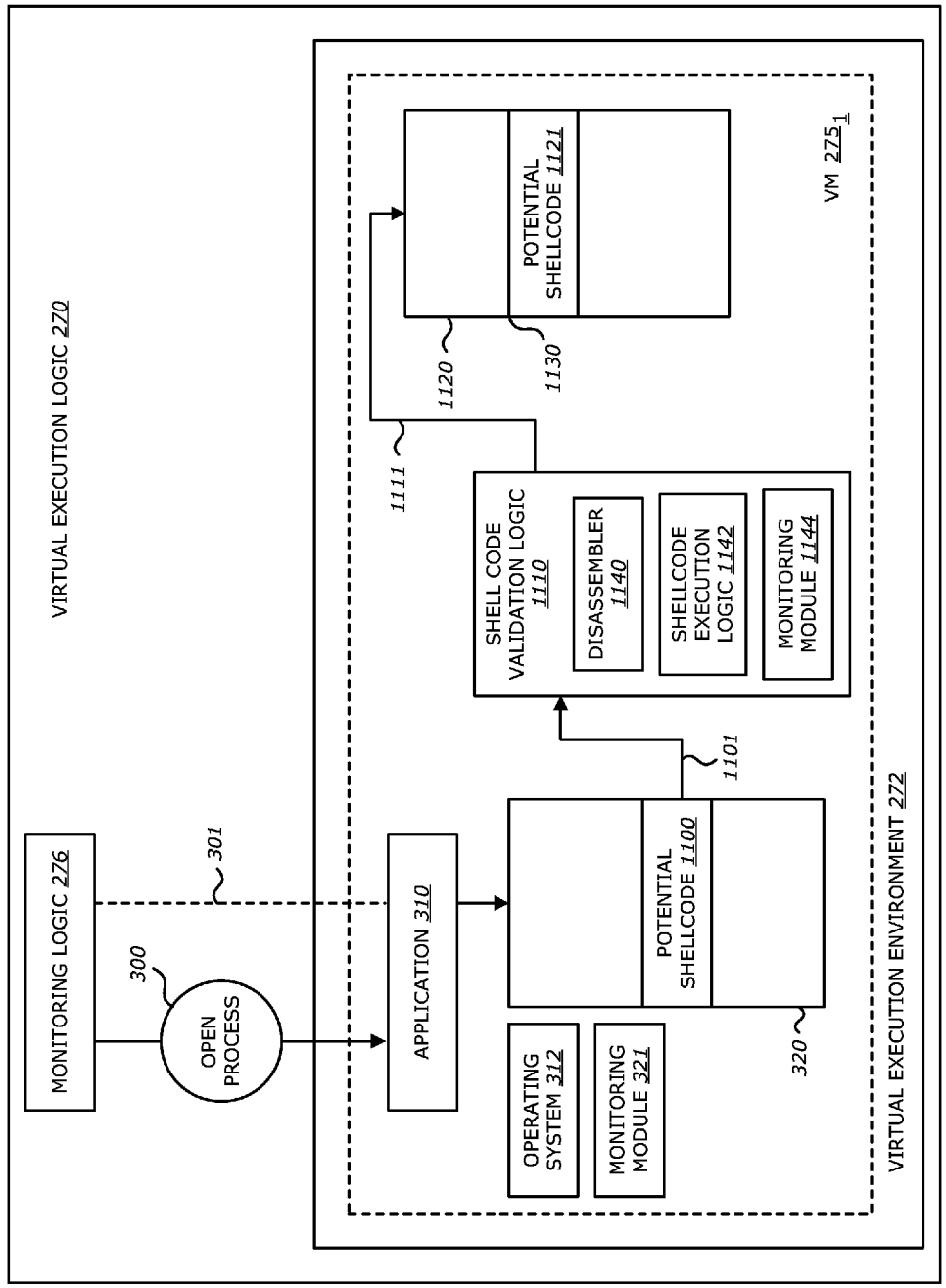
FIG. 11 is an exemplary block diagram of a virtual execution logic configured with shellcode validation logic.

A. First Embodiment—TDP System Deploying Heap Spray Detection Logic and Shellcode Validation Referring to FIG. 11, an exemplary block diagram of a virtual execution logic configured with shellcode validation logic is shown. Herein, the virtual execution logic 270 includes the monitoring logic 276, a shellcode validation logic 1110 and the virtual execution environment 272 which includes VM $275_1$. In one embodiment, the virtual execution logic 270, as illustrated in FIG. 11, may be incorporated into a TDP system such as TDP system $210_1$ of FIG. 2A. In the embodiment where the virtual execution logic 270 of TDP system $210_1$ includes the shellcode validation logic 1110, the monitoring logic 276 conducts an in-depth analysis of at least one object of the incoming objects 110 by instantiating (creating an instance of) and executing an application to virtually execute the object and analyzing behavior of the object during virtual execution.

Before analysis in the VM $275_1$ begins, the monitoring logic 276 is equipped with a monitoring module 321 operable in conjunction with the virtual heap 320. Upon detection of potential shellcode 1100 within the virtual heap 320, a copy of the potential shellcode 1100 is created by the monitoring logic 276, which will be discussed in more depth below (the copied version will be referred to as "potential shellcode 1121"). The copy is passed to the shellcode validation logic 1110 (represented by line 1101). Thereafter, the shellcode validation logic 1110 requests allocation of a second portion of virtual memory for use in conjunction with its monitoring and analysis activities, and inserts potential shellcode 1121 into this virtual heap 1120 for further analysis (represented by line 1111). A disassembler 1140 of the shellcode validation logic 1110 disassembles the potential shellcode 1121 to determine the location of the first actual instruction of the potential shellcode 1121 (discussed more in-depth below). The shellcode execution logic 1142 of the shellcode validation logic 1110 begins execution of the potential shellcode 1121.

The monitoring module 1144 of the shellcode validation logic 1110 analyzes the behavior of the potential shellcode 1121 during execution within the VM $275_1$ in the same manner as the monitoring module 321 monitors the behavior of the execution of application 310. When anomalous activity indicative of the potential shellcode 1121 being associated with a malicious attack has been detected, the score determination logic 278 (FIG. 9) may assign a score to the object containing potential shellcode 1100. The score signifying a probability that the object containing the potential shellcode 1100 is associated with, or a portion of, an exploit.

Figure 12:
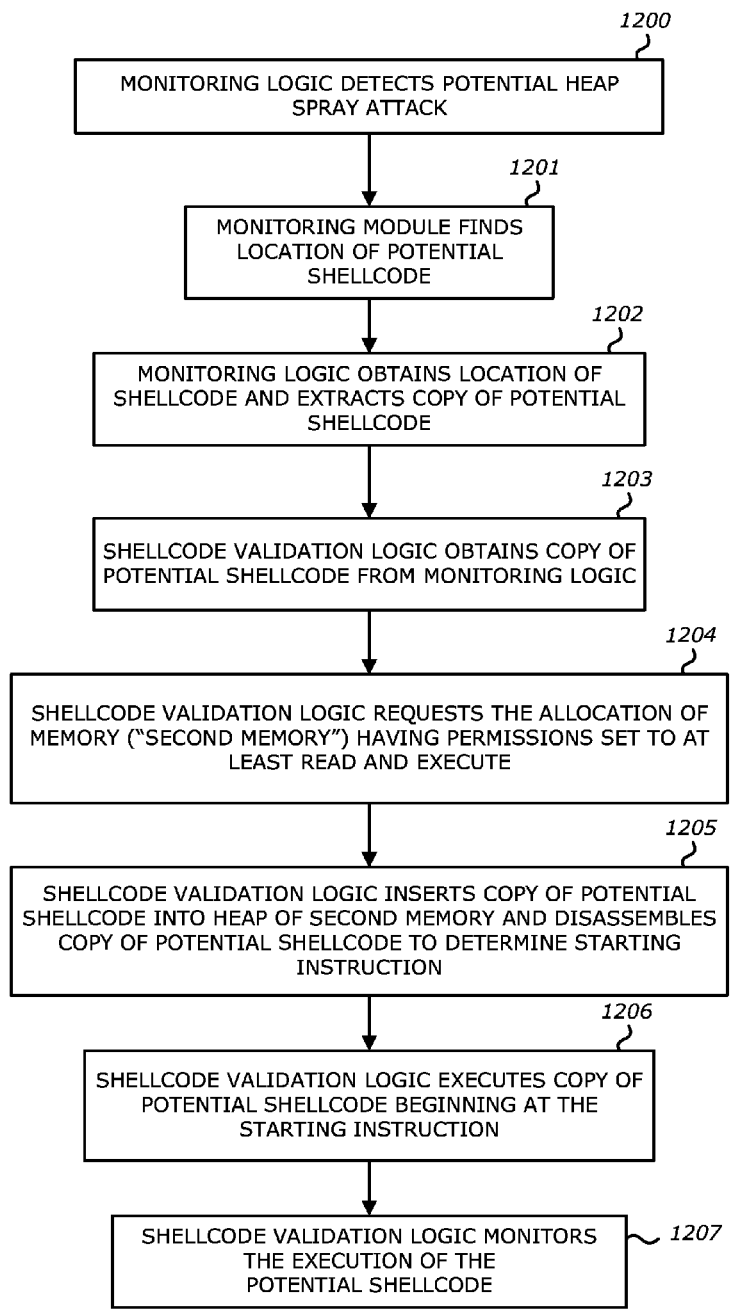
FIG. 12 is a flowchart of an exemplary method for validating shellcode.

Referring to FIG. 12, a flowchart of an exemplary method for validating potential shellcode is shown, where the operations set forth in FIG. 12 are combined with the logic structures set forth in FIG. 11. In block 1200, the monitoring logic 276 of FIG. 11 detects a potential heap spray attack. As discussed above, a heap spray attack may be detected in one or more ways including: (i) analysis of the memory allocation for an application used to execute an object, (ii) detection of a pattern appearing on a blacklist of patterns, and/or (iii) detection of a new NOP sled pattern.

In block 1201, the monitoring module 321 of FIG. 11 finds the location of the potential shellcode within the virtual heap 320 of FIG. 11. In one embodiment, the potential shellcode location may be determined by recognizing a NOP sled/potential shellcode/NOP sled sequence. By detecting a sequence including a NOP sled followed by a series of bytes other than a NOP instruction followed by another NOP sled (a "NOP sled/potential shellcode/NOP sled sequence" as discussed above), the monitoring module 321 can conclude that the series of bytes other than a NOP instruction surrounded by NOP sleds is likely shellcode, especially if a potential heap spray attack has been detected.

In a second embodiment, if the object is a Portable Document Format (PDF) file, the monitoring module 321 of FIG. 11 may parse JavaScript within the PDF file to reveal the location of potential shellcode. In yet another embodiment, if the object is a PDF file, the monitoring module 321 of FIG. 11 may analyze images embedded within the PDF file to determine the location of potential shellcode. The parsing of the JavaScript or the embedded images within PDF files is done because those are two ways in which a malware writer may insert shellcode into a PDF file. Alternatively, if the object is an Adobe® Flash video (FLV) file, the monitoring module 321 of FIG. 11 may analyze the ActionScript within the FLV file to determine the location of potential shellcode. If the object is a Microsoft® Word® file, such as a file containing a ".docx" file extension, the monitoring module 321 of FIG. 11 may analyze one or more Microsoft® Visual Basic® (VB) scripts or any macros present in the Word® file to determine the location of the potential shellcode.

Referring to both FIG. 11 and FIG. 12, in block 1202 of FIG. 12, the monitoring logic 276 obtains the location of the potential shellcode 1100 from the monitoring module 321 and extracts a copy of the potential shellcode 1100 from the virtual heap 320. In block 1203, the shellcode validation logic 1110 obtains a copy the potential shellcode 1100 (i.e., potential shellcode 1121). The potential shellcode 1121 is typically transferred to shellcode validation logic 1110 as a binary file as this is how the potential shellcode 1100 appears in memory. Furthermore, whether the potential shellcode 1100 is encoded or not does not affect the shellcode validation logic 1110 when the potential shellcode 1121 is transmitted as a binary file. Alternatively, the monitoring logic 276 of FIG. 11 may run a disassembler to disassemble the potential shellcode 1100. The monitoring logic 276 would then output the disassembled content as text to the shellcode validation logic 1110.

In block 1204, the shellcode validation logic 1110 requests memory to be allocated within VM $275_1$ in which to store the potential shellcode 1121 (the virtual heap of the second region of allocated memory is represented by object 1120 in FIG. 11). Specifically, the shellcode validation logic 1110 requests that the permissions of the second region of allocated memory are set to, at least, read and execute upon allocation. The second virtual heap 1120 is managed by the shellcode validation logic 1110. The potential shellcode 1121 is then inserted within the second virtual heap 1120.

In block 1205, the disassembler 1140 within the shellcode validation logic 1110 disassembles the potential shellcode 1121 to determine the actual starting instruction of the potential shellcode 1121. This allows the shellcode validation logic 1110 to begin execution of the potential shellcode by executing the starting instruction instead of other data or instructions that may have been copied and extracted as part of the copy of the potential shellcode 1110 (such excess data may be referred to as "garbage data"). For instance, in one embodiment, the garbage data may represent data associated with a potential heap spray attack that was copied and included in the potential shellcode 1121 but is not useful in this analysis. In that instance, if the shellcode validation logic 1110 attempts to execute the garbage data, the garbage data may cause the execution of the potential shellcode 1121 to crash if the instruction is an attempt to access memory at an invalid location, for example. Other embodiments may include the first instruction being an instruction reserved only for use by the kernel. Therefore, the disassembler 1140 disassembles the potential shellcode 1121 to determine the location of the actual starting instruction of the potential shellcode 1121 (the location of the first actual instruction is represented by 1130 in FIG. 11).

In block 1206, the shellcode execution logic 1142 of the shellcode validation logic 1110 begins execution of the potential shellcode 1121 at the first instruction. In block 1207, the monitoring module 1144 of the shellcode validation logic 1110 monitors the execution of the potential shellcode 1121. The monitoring module 1144 may observe the behavior of the execution of the potential shellcode 1121 for anomalous activity indicative of the suspect shellcode and associated with a malicious attack (such as a heap spray attack). Examples of anomalous behavior may include, but are not limited or restricted to, attempted modification of the operating system running in the virtual machine, attempted downloads of external computer code, and/or callbacks placed to external servers. If such anomalous activity has been detected, the following may occur in various embodiments: (i) metadata related to the activity is stored in database 255 (FIGS. 2A and 2B); (ii) the shellcode validation logic 1110 may assign a score to the object, or may cause the score generation logic 276 (FIGS. 2A and 2B) to assign a score to the object, signifying a probability that the object containing the potential shellcode 1100 is associated with, or a portion of, an exploit; and (iii) the shellcode validation logic 1110 may communicate the activity to the alert generation logic 276 (FIGS. 2A and 2B), which may generate an alert.

Figure 13:
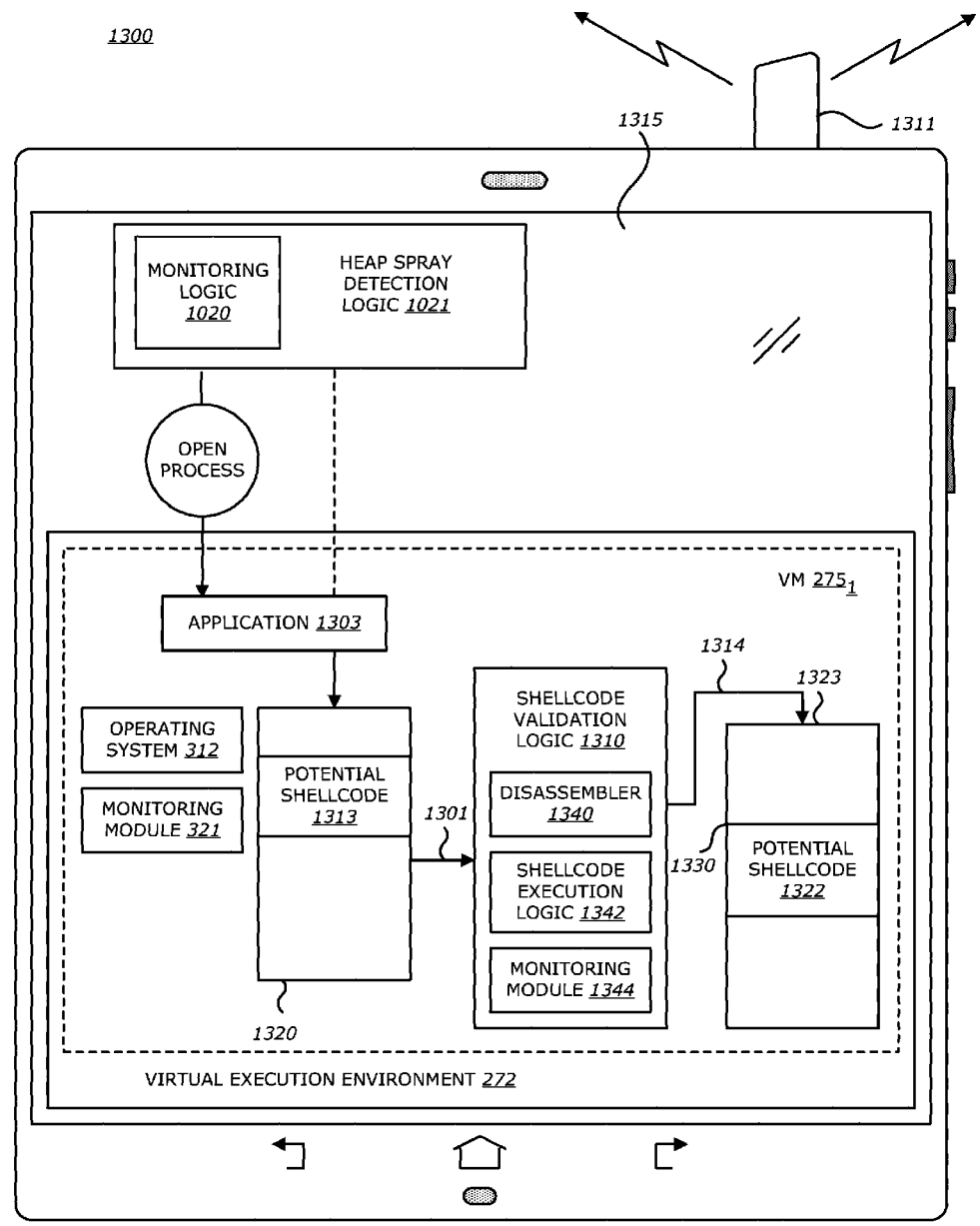
FIG. 13 is an exemplary illustration of a network device configured with a heap spray detection logic and a shellcode validation logic.

B. Second Embodiment—Network Device Deploying a Heap Spray Detection Logic and Shellcode Validation According to an alternative embodiment of the disclosure, a network device may be configured to implement at least a monitoring logic independently of a separate physical device wherein the monitoring logic implements a heap spray detection logic and a shellcode validation logic. Referring to FIG. 13, a network device 1300 is shown to incorporate the virtual execution environment 272 including the VM 275₁. In FIG. 13, the network device 1300 is represented by, as an illustrative example, a tablet 1300. The tablet 1300 includes a display screen 1315, an antenna 1311 and monitoring logic 1020. The monitoring logic 1020 includes heap spray detection logic 1021 which monitors the behavior of applications from within the tablet 1300.

As discussed above, the heap spray detection logic 1021 performs function call hooking in order to observe API calls and/or system calls. In the embodiment illustrated in FIG. 13, once a function call or system call is observed, the heap spray detection logic 1021 may perform an in-depth analysis of the application that is started as a result of the API call or system call by starting an instance of the application 1303 in VM 275₁.

Upon detection of the potential shellcode 1313 within the virtual heap 1320, a copy of the potential shellcode 1313 is extracted by the monitoring logic 1020 (the copied version will be referred to as "potential shellcode 1322"). The copy is then passed to the shellcode validation logic 1310 (represented by line 1301). Thereafter, the shellcode validation logic 1310 requests allocation of a second portion of virtual memory (the virtual heap of the second portion of virtual allocated memory is represented by object 1323), and inserts the potential shellcode 1322 into the virtual heap 1323 for further analysis (represented by line 1314). As discussed above, the disassembler 1340 of the shellcode validation logic 1310 disassembles the potential shellcode 1322 to determine the first instruction of the potential shellcode 1322. In addition, the shellcode execution logic 1342 of the shellcode validation logic 1310 begins execution of the potential shellcode 1322 at the first instruction.

Thereafter, the monitoring module 1344 of the shellcode validation logic 1310 analyzes the behavior of the potential shellcode 1322 during execution within the VM 275₁. When anomalous activity indicative of the potential shellcode 1322 being associated with a malicious attack has been detected, the score determination logic 278 (not shown) may assign a score to the object containing potential shellcode 1313. The score signifying a probability that the object containing the potential shellcode 1313 is associated with, or a portion of, an exploit.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A computerized method, comprising:
   instantiating an instance of an application within a virtual machine, the application for executing an object;
   allocating a first region of memory to the virtual machine for use in execution of the object with the application;
   responsive to detecting one or more characteristics of a heap spray attack within a sequence of bytes within the first region of memory, allocating a second region of memory to the virtual machine, wherein the first region of memory is a first virtual heap and the second region of memory is a second virtual heap different than the first virtual heap;
   copying the sequence of bytes from the first region of memory to the second region of memory;
   beginning execution, by the virtual machine, of the copy of the sequence of bytes stored in the second region of memory; and
   monitoring the execution of the copy of the sequence of bytes to detect characteristics of anomalous behavior.

2. The computerized method of claim 1, wherein the copying of the sequence of bytes comprises
   requesting allocation of the second region of memory, and inserting the copy of the sequence of bytes into the second region of allocated memory.

3. The computerized method of claim 1, wherein the sequence of bytes is copied and inserted as a binary file.

4. The computerized method of claim 1, wherein a characteristic of the one or more characteristics of the heap spray attack includes at least one sequence of No Operation (NOP) instructions adjacent to the sequence of bytes at a particular location within the first region of allocated memory.

5. The computerized method of claim 4, wherein the sequence of bytes includes potential shellcode, the potential shellcode being computer code that includes one or more characteristics indicative of the capability of performing malicious activity.

6. The computerized method of claim 5, further comprising:

prior to copying the potential shellcode from the first region of allocated memory, determining that the potential shellcode is present in the first region of allocated memory.

7. The computerized method of claim 6, wherein a first sequence of NOP instructions is determined to be adjacent to a first side of the potential shellcode, the first sequence of NOP instructions being one of the at least one sequence of NOP instructions.

8. The computerized method of claim 7, wherein a second sequence of NOP instructions is determined to be adjacent to a second side of the potential shellcode, the second sequence of NOP instructions being one of the at least one sequence of NOP instructions.

9. The computerized method of claim 5, further comprising:
transmitting the copy of the potential shellcode to a module, wherein the module requests the allocation of the second region of memory and inserts the copy of the potential shellcode into the second region of allocated memory, the permissions of the second region of allocated memory are to be set to allow contents of the second region of allocated memory to be read and executed.

10. The computerized method of claim 9, further comprising:
dynamically configuring a virtual machine with a software image representing a current operating state of a targeted client device, the software image representing content and structure of a storage volume for the targeted client device at a time of configuring the virtual machine, wherein the module is located within the virtual machine.

11. The computerized method of claim 10, wherein the module begins execution of the copy of the potential shellcode within the virtual machine.

12. The computerized method of claim 5, further comprising:
prior to beginning execution of the copy of the potential shellcode, disassembling the copy of the potential shellcode to determine the starting instruction of the potential shellcode.

13. The computerized method of claim 5, wherein the potential shellcode is copied from a Portable Document Format (PDF) file and at least a portion of JavaScript within the PDF file is parsed to reveal a location of the potential shellcode within the first region of allocated memory.

14. The computerized method of claim 13, wherein one or more images embedded within the PDF file are analyzed to reveal the location of the potential shellcode within the first region of allocated memory.

15. The computerized method of claim 5, wherein the potential shellcode is copied from a video file and at least a portion of the video file is analyzed to reveal a location of the potential shellcode within the first region of allocated memory.

16. The computerized method of claim 5, wherein the potential shellcode is copied from a non-executable file and one or more scripts within the file are analyzed to reveal a location of the potential shellcode within the first region of allocated memory.

17. The computerized method of claim 5, wherein a score is assigned to at least a portion of network traffic from which the potential shellcode was copied, the score signifying a probability that at least the portion of the network traffic is associated with an exploit.

18. The computerized method of claim 5, further comprising:
generating an alert based the analysis of the execution of the copy of the potential shellcode.

19. The computerized method of claim 1, wherein prior to detecting the one or more characteristics of the heap spray within the first region of memory, beginning execution of the object using the first region of memory.

20. A system comprising:
one or more processors; and
a storage module communicatively coupled to the one or more processors, the storage module includes logic to:
instantiate an instance of an application within a virtual machine, the application for executing an object;
allocate a first region of memory to the virtual machine for use in execution of the object with the application;
responsive to detecting one or more characteristics of a heap spray attack within a sequence of bytes within the first region of memory, allocate a second region of memory to the virtual machine, wherein the first region of memory is a first virtual heap and the second region of memory is a second virtual heap different than the first virtual heap;
copy the sequence of bytes from the first region of memory to the second region of memory;
begin execution, by the virtual machine, of the copy of the sequence of bytes stored in the second region of memory; and
monitor the execution of the copy of the sequence of bytes to detect one or more characteristics of anomalous behavior.

21. The system of claim 20, wherein the sequence of bytes includes potential shellcode, the potential shellcode being computer code that includes one or more characteristics indicative of the capability of performing malicious activity.

22. The system of claim 20, wherein the sequence of bytes is copied and inserted as a binary file.

23. The system of claim 20, wherein a characteristic of the one or more characteristics of the heap spray attack includes at least one sequence of No Operation (NOP) instructions adjacent to the sequence of bytes at a particular location within the first region of allocated memory.

24. The system of claim 23, wherein the sequence of bytes includes potential shellcode, the potential shellcode being computer code that includes one or more characteristics indicative of the capability of performing malicious activity.

25. The system of claim 24, wherein a first sequence of NOP instructions is determined to be adjacent to a first side of the potential shellcode, the first sequence of NOP instructions being one of the at least one sequence of NOP instructions.

26. The system of claim 25, wherein a second sequence of NOP instructions is determined to be adjacent to a second side of the potential shellcode, the second sequence of NOP instructions being one of the at least one sequence of NOP instructions.

27. The system of claim 24, further comprising:
transmitting the copy of the potential shellcode to a module, wherein the module requests the allocation of the second region of memory and inserts the copy of the potential shellcode into the second region of allocated memory, the permissions of the second region of allocated memory are to be set to allow contents of the second region of allocated memory to be read and executed.

28. The system of claim 27, further comprising:
dynamically configuring a virtual machine with a software image representing a current operating state of a targeted client device, the software image representing content and structure of a storage volume for the targeted client device at a time of configuring the virtual machine, wherein the module is located within the virtual machine.

29. The system of claim 20, wherein prior to detecting the one or more characteristics of the heap spray within the first region of memory, beginning execution of the object using the first region of memory.

\* \* \* \* \*